(12) United States Patent
Jung et al.

(10) Patent No.: US 9,372,370 B2
(45) Date of Patent: Jun. 21, 2016

(54) LIQUID CRYSTAL DISPLAY AND METHOD OF MANUFACTURING THE SAME

(71) Applicant: Samsung Display Co., Ltd., Yongin, Gyeonggi-do (KR)

(72) Inventors: Yang-ho Jung, Yongin (KR); Hoon Kang, Yongin (KR); Seung Bo Shim, Yongin (KR); Jin Ho Ju, Yongin (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 34 days.

(21) Appl. No.: 14/271,664

(22) Filed: May 7, 2014

(65) Prior Publication Data

US 2015/0146138 A1　May 28, 2015

(30) Foreign Application Priority Data

Nov. 28, 2013　(KR) .................. 10-2013-0146081

(51) Int. Cl.
*G02F 1/1345*　(2006.01)
*G02F 1/1341*　(2006.01)
*G02F 1/1333*　(2006.01)

(52) U.S. Cl.
CPC ........ *G02F 1/1341* (2013.01); *G02F 1/133377* (2013.01)

(58) Field of Classification Search
CPC ............ G02F 1/1343; G02F 1/133512; G02F 1/136209
USPC .................................. 349/44, 152, 153, 154
See application file for complete search history.

(56) References Cited

U.S. PATENT DOCUMENTS

| | | | |
|---|---|---|---|
| 6,400,430 B2 | 6/2002 | Nakao et al. | |
| 7,729,038 B2 | 6/2010 | Ohno et al. | |
| 2006/0146267 A1* | 7/2006 | Choi et al. | 349/156 |
| 2009/0085482 A1* | 4/2009 | Bae et al. | 313/582 |
| 2013/0093985 A1* | 4/2013 | Kang et al. | 349/106 |
| 2013/0182203 A1 | 7/2013 | Lee et al. | |

FOREIGN PATENT DOCUMENTS

| | | |
|---|---|---|
| KR | 10-0144896 | 4/1998 |
| KR | 10-0653780 | 11/2006 |
| KR | 10-2010-0079861 | 7/2010 |
| KR | 10-2012-0077159 | 7/2012 |

(Continued)

OTHER PUBLICATIONS

Huesgen, et al., "Optimization and characterization of wafer-level adhesive bonding with patterned dry-film photoresist for 3D MEMS integration", Sensors and Actuators A 162, 2010, pp. 137-144.

(Continued)

*Primary Examiner* — Lucy Chien
(74) *Attorney, Agent, or Firm* — Knobbe Martens Olson & Bear LLP

(57) ABSTRACT

A liquid crystal display includes: a substrate; a thin film transistor disposed on the substrate; a pixel electrode disposed on the thin film transistor; and a roof layer facing the pixel electrode, wherein a plurality of microcavities are formed between the pixel electrode and the roof layer, each microcavity includes liquid crystal materials, a partition wall is formed between the microcavities, and the roof layer includes a dry film.

26 Claims, 32 Drawing Sheets

(56) References Cited

FOREIGN PATENT DOCUMENTS

| KR | 10-2012-0089518 | 8/2012 |
|---|---|---|
| KR | 10-1275802 | 6/2013 |

OTHER PUBLICATIONS

Radadia, et al., "A 3DMicromixer Fabricated With Dry Film Resist", IEEE, pp. 361-364, MEMS 2007, Kobe, Japan, Jan. 21-25, 2007.

* cited by examiner

LIQUID CRYSTAL DISPLAY AND METHOD OF MANUFACTURING THE SAME

CROSS-REFERENCE TO RELATED APPLICATIONS

This application claims priority to, and the benefit of, Korean Patent Application No. 10-2013-0146081 filed in the Korean Intellectual Property Office on Nov. 28, 2013, the entire contents of which are incorporated herein by reference.

BACKGROUND

1. Field

The present disclosure relates to a liquid crystal display and a manufacturing method thereof.

2. Description of the Related Technology

A liquid crystal display is one type of flat panel display device that is being widely used. It typically includes two display panels, wherein field generating electrodes such as a pixel electrode and a common electrode are formed with a liquid crystal layer interposed therebetween.

The liquid crystal display generates an electric field in a liquid crystal layer by applying a voltage to the field generating electrodes to determine orientations of liquid crystal molecules of the liquid crystal layer and control polarization of incident light, thereby displaying an image.

A technique of forming a cavity in a unit of a pixel and filling the cavity with liquid crystals to implement a display has been developed for one of the liquid crystal displays. This technique serves to manufacture a display by forming a sacrificial layer with an organic material, and the like, forming a roof layer at an upper portion of the sacrificial layer, removing the sacrificial layer, and filling an empty space formed through the removal of the sacrificial layer with liquid crystals through a liquid crystal injection hole, instead of forming an upper panel on a lower panel.

However, the technique requires a lengthened process time for removing the sacrificial layer.

The above information disclosed in this Background section is only for enhancement of understanding of the background of the invention and therefore it may contain information that does not form the prior art that is already known in this country to a person of ordinary skill in the art.

SUMMARY OF CERTAIN INVENTIVE ASPECTS

The present disclosure has been made in an effort to provide a liquid crystal display and a manufacturing method thereof having advantages of being capable of reducing a process time.

One embodiment provides a liquid crystal display including: a substrate; a thin film transistor disposed on the substrate; a pixel electrode disposed on the thin film transistor; and a roof layer facing the pixel electrode, wherein a plurality of microcavities are formed between the pixel electrode and the roof layer, each microcavity of the plurality of microcavities including liquid crystal materials, and wherein a partition wall is formed between the microcavities, the roof layer including a dry film.

The roof layer and the partition wall may be made of different materials from one another.

A width of the partition wall may become narrower when viewed from the substrate toward the roof layer.

The liquid crystal display may further include a capping layer provided on the roof layer, wherein the capping layer contacts an upper surface of the roof layer.

A liquid crystal injection hole formation region may be provided between the microcavities, and the capping layer may cover the liquid crystal injection hole formation region.

The liquid crystal display may further include a common electrode provided between the microcavities and the roof layer.

The common electrode may be provided between the partition wall and the roof layer.

The common electrode may be in contact with the roof layer.

The liquid crystal display may further include a common electrode having a protection layer provided between the common electrode and the pixel electrode.

The roof layer may be in contact with the partition wall.

The partition wall may include a dry film, and the partition wall and the roof layer may together form an integrally formed structure.

The partition wall may become wider when viewed from the substrate toward the roof layer.

The liquid crystal display may further include a common electrode provided on the roof layer.

The liquid crystal display may further include a capping layer provided on the common electrode, a liquid crystal injection hole formation region may be provided between the microcavities, and the capping layer may cover the liquid crystal injection hole formation region.

The liquid crystal display may further include an upper roof layer provided between the common electrode and the capping layer.

Another embodiment provides a manufacturing method of a liquid crystal display, including: forming an original roof layer on a carrier substrate; forming a transfer structure by forming a common electrode on the original roof layer; forming a partition wall on a display panel including a thin film transistor; forming a plurality of microcavities surrounded by the partition wall and the original roof layer by transferring the transfer structure onto the display panel; separating the carrier substrate from the transfer structure; exposing a part of the common electrode by partially removing the original roof layer; forming a liquid crystal injection hole formation region between the microcavities by partially etching the exposed part of the common electrode; injecting a liquid crystal material into the microcavities through the liquid crystal injection hole formation region; and forming a capping layer to fill the liquid crystal injection hole formation region.

The original roof layer may include a dry film resist.

The forming of the partition wall may include removing the partition wall from the liquid crystal injection hole formation region, and forming the partition wall to be provided at a region corresponding to a light-blocked region of the display panel.

The manufacturing method may further include forming a roof layer by partially removing the original roof layer and hardening the roof layer.

The common electrode may be provided between the partition wall and the roof layer.

Yet another embodiment provides a manufacturing method of a liquid crystal display, including: forming a transfer structure by forming an original roof layer on a substrate; forming a partition wall on a display panel including a thin film transistor; forming a plurality of microcavities surrounded by the partition wall and the original roof layer by transferring the transfer structure onto the display panel; separating a carrier substrate from the transfer structure; exposing a part of the common electrode by partially removing the original roof layer; forming a liquid crystal injection hole formation region between the microcavities by partially etching an exposed part of the common electrode; injecting a liquid crystal material into the microcavities through the liquid crystal injection hole formation region; and forming a capping layer to fill the liquid crystal injection hole formation region.

The original roof layer may include a dry film resist.

The forming of the partition wall may include: removing the partition wall from the liquid crystal injection hole formation region; and forming the partition wall to be provided at a region corresponding to a light-blocked region of the display panel.

The manufacturing method may further include forming a roof layer by partially removing the original roof layer and hardening the roof layer.

The partition wall and the roof layer may be in contact with each other.

Yet another embodiment provides a manufacturing method of a liquid crystal display, including: forming an original roof layer on a carrier substrate; forming a transfer structure including a roof layer region and a partition wall region by exposing the original roof layer; transferring the transfer structure onto a display panel including a thin film transistor; separating the carrier substrate from the transfer structure; respectively forming a roof layer and a partition wall at the roof layer region and the partition wall region by developing the original roof layer, forming a plurality of microcavities surrounded by the partition wall and the original roof layer, and forming a liquid crystal injection hole formation region between the microcavities; forming a common electrode on the roof layer; injecting a liquid crystal material into the microcavities through the liquid crystal injection hole formation region; and forming a capping layer to fill the liquid crystal injection hole formation region.

The original roof layer may include a dry film resist.

The manufacturing method may further include forming an upper roof layer including a photo-reactive material on the common electrode, and the common electrode may be patterned by using the upper roof layer as a mask.

The manufacturing method may further include hardening the roof layer and the partition wall.

Yet another embodiment provides a manufacturing method of a liquid crystal display, including: forming an original roof layer on a carrier substrate; forming a transfer structure including a roof layer region and a partition wall region by exposing the original roof layer; transferring the transfer structure onto a display panel including a thin film transistor; separating the carrier substrate from the transfer structure; forming a common electrode on the original roof layer; exposing a part of the original roof layer by patterning the common electrode; respectively forming a roof layer and a partition wall at the roof layer region and the partition wall region by developing the original roof layer, forming a plurality of microcavities surrounded by the partition wall and the original roof layer, and forming a liquid crystal injection hole formation region between the microcavities; injecting a liquid crystal material into the microcavities through the liquid crystal injection hole formation region; and forming a capping layer to fill the liquid crystal injection hole formation region.

The original roof layer may include a dry film resist.

The manufacturing method may further include forming an upper roof layer including a photo-reactive material on the common electrode, and the common electrode may be patterned by using the upper roof layer as a mask.

The manufacturing method may further include hardening the roof layer, the partition wall, and the upper roof layer.

In accordance with certain embodiments, it is possible to fill liquid crystal in cavities to realize a display without formation of a sacrificial layer and a roof layer by forming a liquid crystal injection hole by transferring a dry film resist on a cavity column in a bridge method after forming the cavity column.

DETAILED DESCRIPTION OF CERTAIN INVENTIVE EMBODIMENTS

Figure 1:
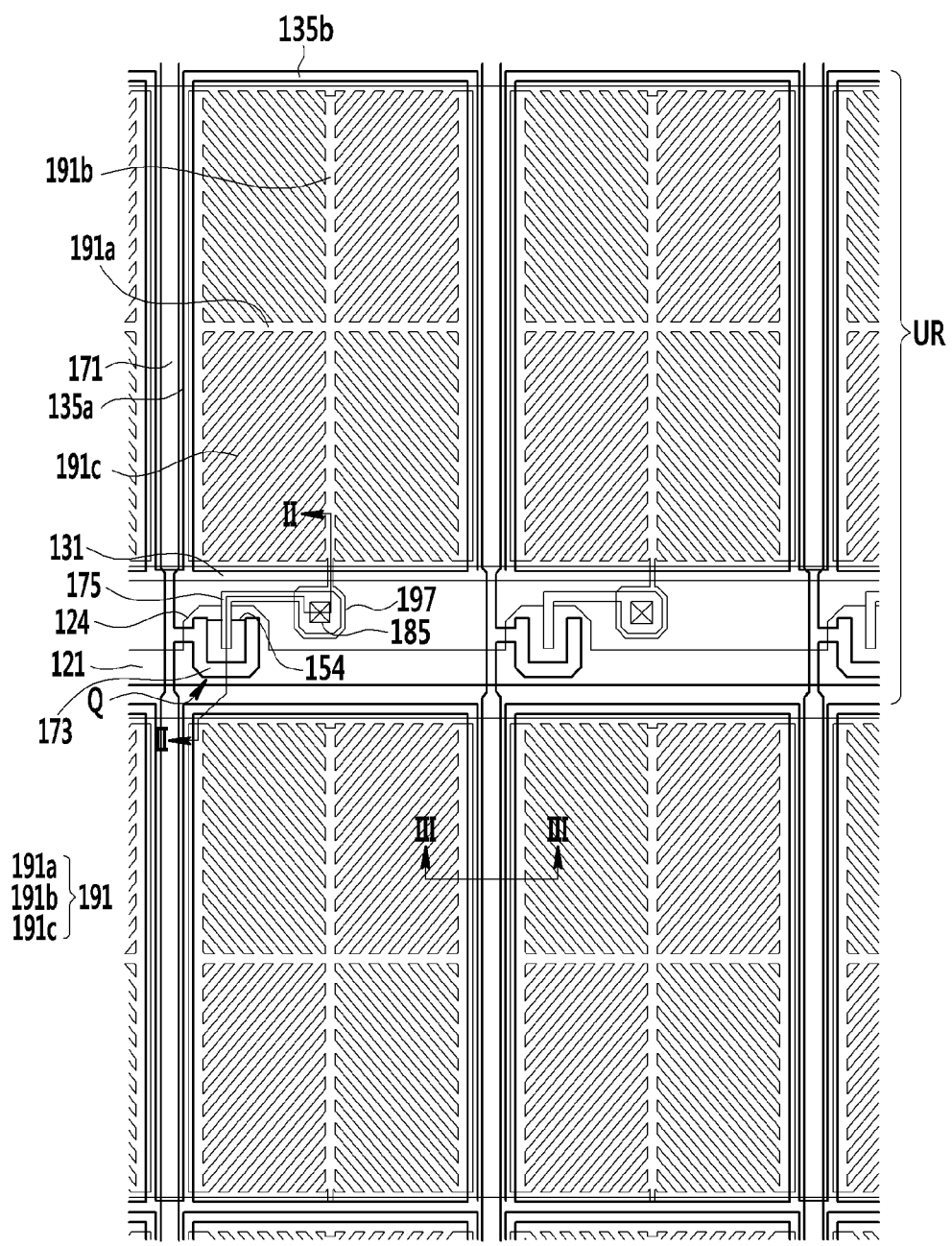
FIG. 1 is a layout view showing a liquid crystal display in accordance with an embodiment.

Hereinafter, certain embodiments will be described in detail with reference to the accompanying drawings. As those skilled in the art would realize, the described embodiments may be modified in various ways, without departing from the spirit or scope of the present invention. On the contrary, embodiments introduced herein are provided to make disclosed contents thorough and complete, and sufficiently transfer the spirit of the present invention to those skilled in the art.

In the drawings, the thickness of layers, films, panels, regions, and the like, may be exaggerated for clarity. It will be understood that when a layer is referred to as being "on" another layer or substrate, it can be directly on the other layer or substrate, or intervening elements may also be present. Like reference numerals generally designate like elements throughout the specification.

Figure 2:
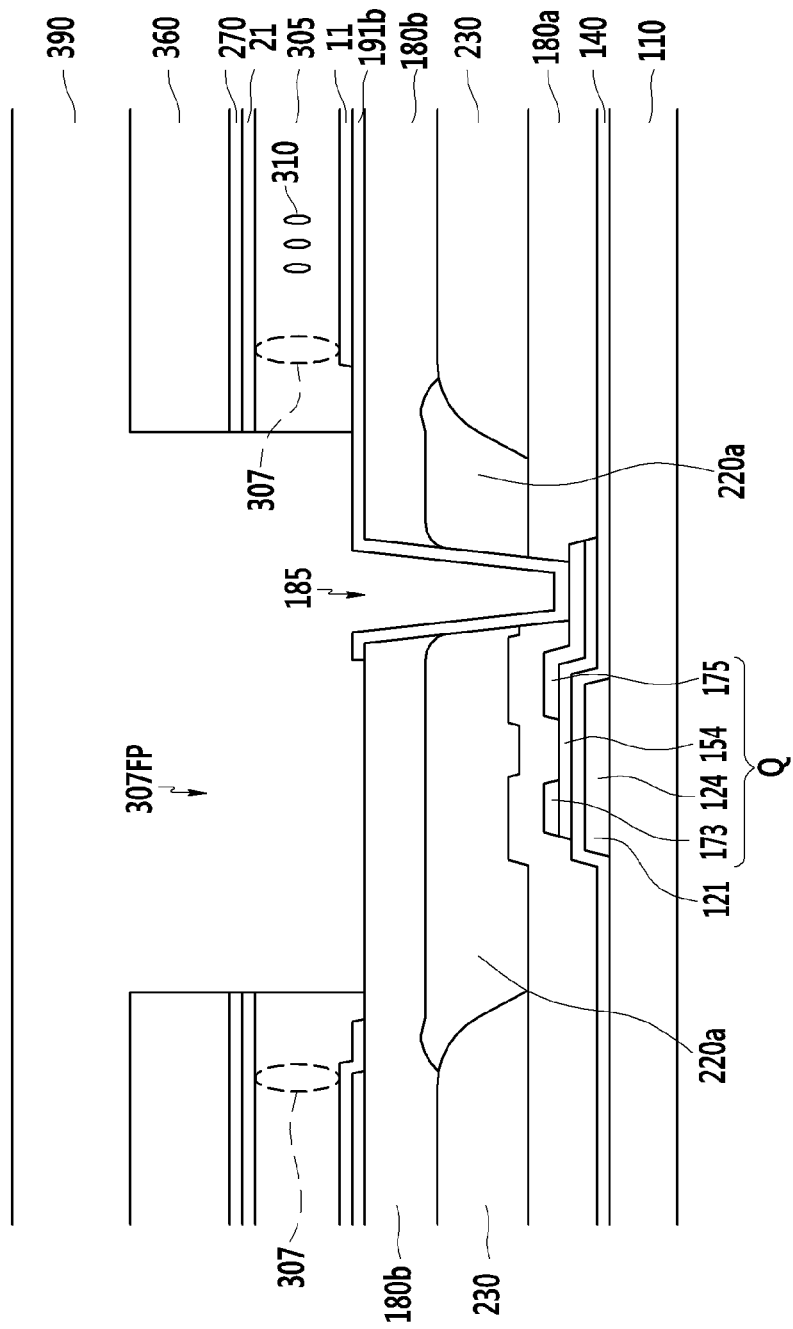
FIG. 2 is a cross-sectional view taken along a line II-II of FIG. 1.
Figure 3:
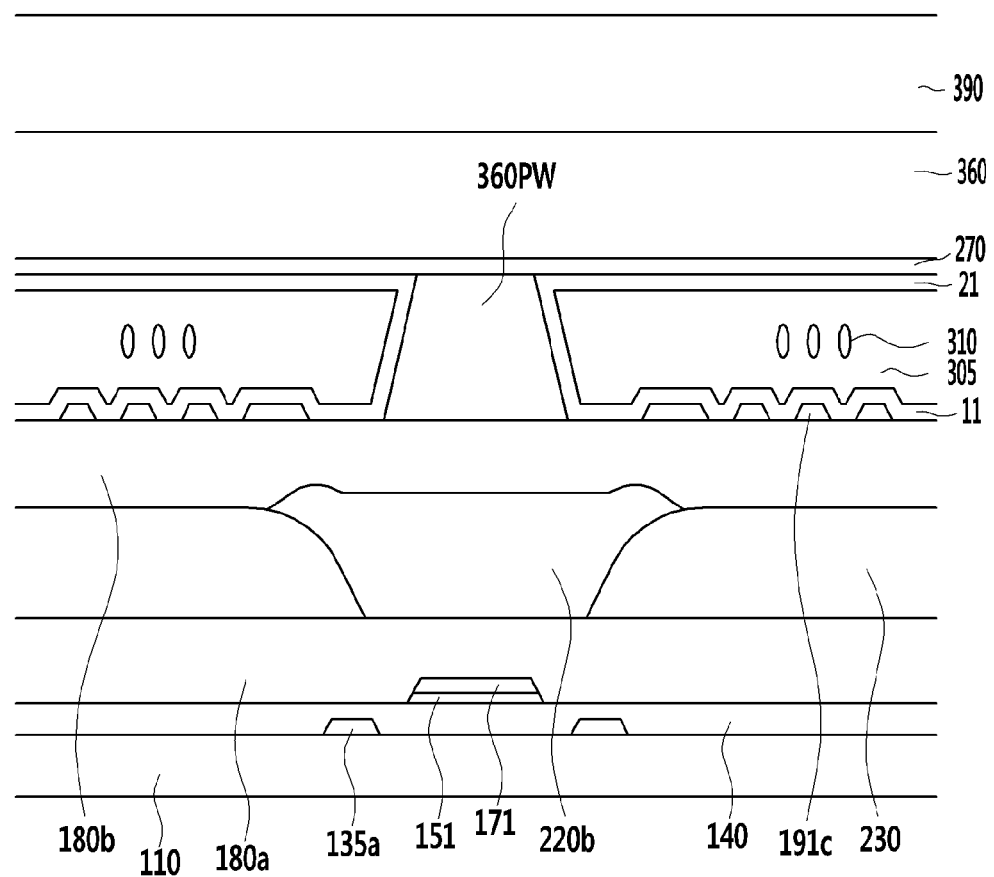
FIG. 3 is a cross-sectional view taken along a line of FIG. 1.

FIG. 1 is a layout view showing a liquid crystal display in accordance with an embodiment. FIG. 2 is a cross-sectional view taken along a line II-II of FIG. 1. FIG. 3 is a cross-sectional view taken along a line of FIG. 1.

Referring to FIGS. 1 to 3, a gate line 121 and a storage electrode line 131 are formed on an insulating substrate 110 formed of transparent glass or plastic. The gate line 121 includes a gate electrode 124. The storage electrode line 131 is mainly extended in a horizontal direction, and transfers a predetermined voltage such as a common voltage Vcom. The storage electrode line 131 includes a pair of vertical storage electrode portions 135a substantially extended to be perpendicular to the gate line 121, and a horizontal storage electrode portion 135b connecting ends of the pair of vertical storage electrode portions 135a to each other. The storage electrode portions 135a and 135b have a structure surrounding a pixel electrode 191.

A gate insulating layer 140 is formed on the gate line 121 and the storage electrode line 131. A semiconductor layer 151 disposed at a lower portion of a data line 171, and a semiconductor layer 154 disposed at a lower portion of a source/drain electrode and at a channel portion of a thin film transistor Q, are formed on the gate insulating layer 140.

A plurality of ohmic contacts may be formed on each of the semiconductor layers 151 and 154, and between the data line 171 and the source/drain electrode, but this is omitted in the drawings.

Data conductors 171, 173, and 175 including a source electrode 173, a data line 171 connected with the source electrode 173, and a drain electrode 175 are formed on each of the semiconductor layers 151 and 154 and the gate insulating layer 140.

The gate electrode 124, the source electrode 173, and the drain electrode 175 form the thin film transistor Q together with the semiconductor layer 154, and a channel of the thin film transistor Q is formed on the portion of the semiconductor layer 154 between the source electrode 173 and the drain electrode 175.

A first protection layer 180a is formed on the data conductors 171, 173, and 175, and an exposed portion of the semiconductor layer 154. The first protection layer 180a may include an inorganic insulating material, such as, for example, a silicon nitride ($SiN_x$) and a silicon oxide ($SiO_x$), or an organic insulating material.

A color filter 230 and a light blocking member 220 are formed on the first protection layer 180a.

The light blocking member 220 has a lattice structure having an opening corresponding to a region displaying an image, and is formed of a material preventing light from being transmitted therethrough. The color filter 230 is formed at an opening of the light blocking member 220. The light blocking member 220 includes a horizontal light blocking member 220a formed in a direction parallel to the gate line 121, and a vertical light blocking member 220b formed in a direction parallel to the data line 171.

The color filter 230 may display one of primary colors, such as three primary colors including, for example, red, green, and blue. However, the colors are not limited to the three primary colors including red, green, and blue, and the color filter 230 may also display one among a cyan-based color, a magenta-based color, a yellow-based color, and a white-based color, for example. The color filter 230 may be formed of materials displaying different colors for each adjacent pixel.

A second protection layer 180b covering the color filter 230 and the light blocking members 220a and 220b is formed on the color filter 230 and the light blocking members 220a and 220b. The second protection layer 180b may include an inorganic insulating material, such as, for example, a silicon nitride (SiNx) and a silicon oxide (SiOx), or an organic insulating material. Unlike the cross-sectional view of FIG. 2, in a case where a step is generated due to a difference in a thickness between the color filter 230 and the light blocking member 220, the second protection layer 180b may include an organic insulating material, so that it is possible to decrease or remove the step.

The color filter 230, the light blocking member 220, and the protection layer 180a and 180b have a contact hole 185 exposing the drain electrode 175.

The pixel electrode 191 is formed on the second protection layer 180b. The pixel electrode 191 may be formed of a transparent conductive material, such as, for example, ITO or IZO.

An overall shape of the pixel electrode 191 is a quadrangle, and the pixel electrode 191 includes cross stems configured by a horizontal stem 191a and a vertical stem 191b crossing the horizontal stem 191a. Further, the pixel electrode 191 is divided into four sub-regions by the horizontal stem 191a and the vertical stem 191b, and each sub-region includes a plurality of minute branches 191c. In one embodiment, the pixel electrode 191 may further include an outer stem surrounding an outer circumference of the pixel electrode 191.

The minute branches 191c of the pixel electrode 191 form an angle of approximately 40° to 45° with the gate line 121 or the horizontal stem 191a. Further, the minute branches of two adjacent sub-regions may be perpendicular to each other. Furthermore, a width of the minute branches 191c is gradually increased, or a distance between the minute branches 191c may be varied.

The pixel electrode 191 includes an extension 197 which is connected at a lower end of the vertical stem 191b and has a larger area than the vertical stem 191b, and is physically and electrically connected with the drain electrode 175 through the contact hole 185 at the extension 197 to receive a data voltage from the data electrode 175.

The thin film transistor Q and the pixel electrode 191 described above are just described as an example, and a structure of the thin film transistor and a design of the pixel electrode may be modified in order to improve side visibility.

A lower alignment layer 11 is formed on the pixel electrode 191, and may be a vertical alignment layer. The lower alignment layer 11, as a liquid crystal alignment layer made of a material such as, for example, polyamic acid, polysiloxane, polyimide, or the like, may include at least one of generally used materials.

An upper alignment layer 21 is disposed at a portion facing the lower alignment layer 11, and a microcavity 305 is formed between the lower alignment layer 11 and the upper alignment layer 21. The upper alignment layer 21 may be formed of the same material as that of the lower alignment layer 11. A liquid crystal material including liquid crystal molecules 310 is injected into the microcavity 305 through a liquid crystal injection hole 307. The microcavity 305 may be formed in a column direction or a vertical direction, of the pixel electrode 191. In one embodiment, the alignment material forming the alignment layers 11 and 21 and the liquid crystal material including the liquid crystal molecules 310 may be injected into the microcavity 305 by using capillary force.

The microcavity 305 is divided in a vertical direction by a plurality of liquid crystal injection hole formation regions 307FP disposed at a portion overlapping the gate line 121, and a plurality of microcavities 305 may be formed along the direction in which the gate line 121 is extended. Each of the plurality of formed microcavities 305 may correspond to a pixel area, and the pixel areas may correspond to a region displaying an image.

A common electrode 270 is disposed on the upper alignment layer 21. The common electrode 270 receives the common voltage, and generates an electric field together with the pixel electrode 191 to which the data voltage is applied to determine a direction in which the liquid crystal molecules 310 disposed at the microcavity 305 between the two electrodes are inclined. The common electrode 270 forms a capacitor with the pixel electrode 191 to maintain the received voltage even after the thin film transistor is turned off. The common electrode 270 may be made of a transparent conductive material such as, for example, ITO or IZO.

A roof layer 360 is disposed on the common electrode 270. The roof layer 360 serves as a support member so that the microcavity 305, which is a space between the pixel electrode 191 and the common electrode 270, is formed. The roof layer 360 may include a dry film. The dry film may be a filmed photosensitive resist, and may be mainly made of a material used for forming a circuit of a printed circuit substrate. The dry film has outstanding adherence and flatness, and thus the dry film is appropriately used as the roof layer 360 in the liquid crystal display in accordance with one embodiment.

A capping layer 390 is provided on the roof layer 360. In one embodiment, a capping layer 390 fills the liquid crystal injection hole formation region 307FP and covers the liquid crystal injection hole 307 of the microcavity 305 exposed by the liquid crystal injection hole formation region 307FP. The capping layer 390 includes an organic material or an inorganic material. Herein, the organic material may be, for example, an acryl-based material, a siloxane-based material, or a styrene-based material, while the inorganic material may be, for example, a silicon nitride (SiNx), a silicon oxide (SiOx), or silicon oxycarbide (SiOC).

In one embodiment, the capping layer 390 may be brought into contact with a side surface and an upper surface of the roof layer 360.

In one embodiment, as shown in FIG. 3, a partition wall 360PW is disposed between the microcavities 305 adjacent to each other in a horizontal direction. The partition wall 360PW is formed in an extending direction of the data line 171, and the common electrode 270 is provided between the partition wall 360PW and the roof layer 360. In one embodiment, the common electrode 270 is provided above the microcavities 305 to extend therethrough and above the partition wall 360PW. In this case, the common electrode 270 provided above the partition wall 360PW may be located on substantially the same plane as that of the common electrode provided above the microcavities 305. In one embodiment, the partition wall 360PW is not brought into contact with the roof layer 360, and a width of the partition wall 360PW may become narrower from the substrate 110 toward the roof layer 360. The partition wall 360PW may include a transparent inorganic material or a transparent organic material which can be used in a column space serving as a constituent element for maintaining a cell gap in a conventional liquid crystal display. Herein, the inorganic material may be, for example, a silicon nitride (SiNx), a silicon oxide (SiOx), or a black matrix of a metal material.

The partition wall 360PW can partition or define the microcavities 305. In one embodiment, since the partition wall 360PW is formed between the microcavities 305, more stress may be generated even when the substrate 110 is bent, and the deformation level of cell gap may be reduced further.

Hereinafter, a manufacturing method of the liquid crystal display described with reference to FIG. 1 to FIG. 3 will be described with reference to FIG. 4 to FIG. 13 in accordance with one embodiment.

FIG. 4 to FIG. 13 are stepwise perspective views showing a manufacturing method of a liquid crystal display in accordance with one embodiment. FIG. 4 to FIG. 13 show a unit region UR (as shown in FIG. 1) as a part of an entire pixel area.

Figure 4:
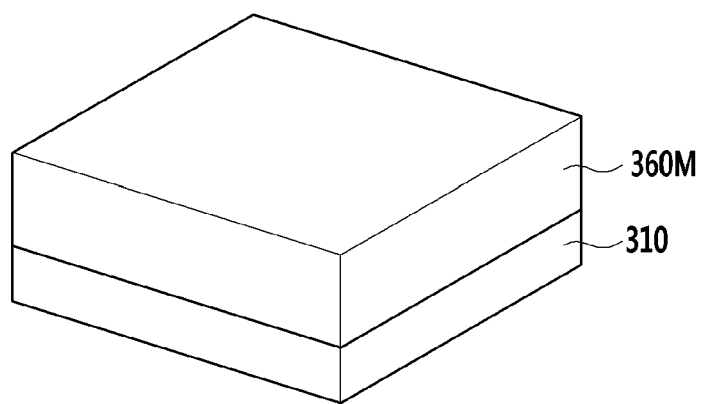
FIG. 4 to FIG. 13 are stepwise perspective views showing a manufacturing method of a liquid crystal display in accordance with an embodiment.
Figure 5:
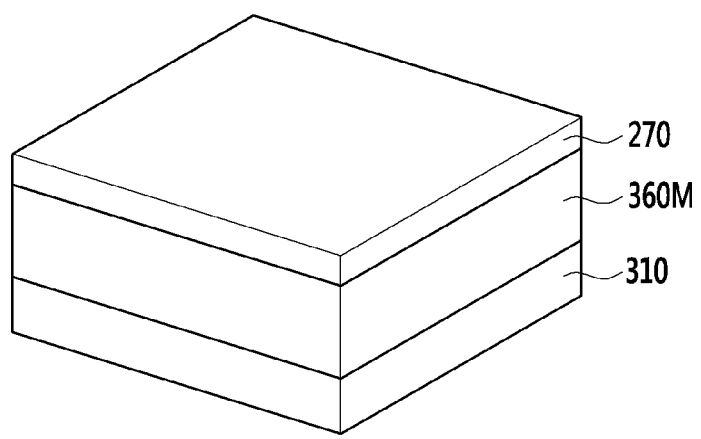

Referring to FIG. 4 and FIG. 5, an original roof layer 360M is formed on a carrier substrate 310, and the common electrode 270 is formed on the original roof layer 360M. The original roof layer 360M is formed of a dry film such as, for example, a filmed photosensitive resist. The common electrode 270 may be made of a transparent conductive material such as, for example, ITO or IZO.

Figure 6:
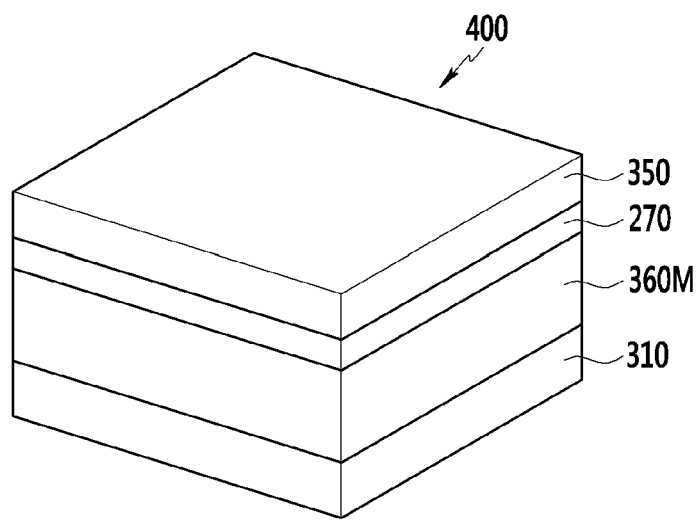

Referring to FIG. 6, a protective film 350 is formed above the common electrode 270 to form a transfer structure 400.

Figure 7:
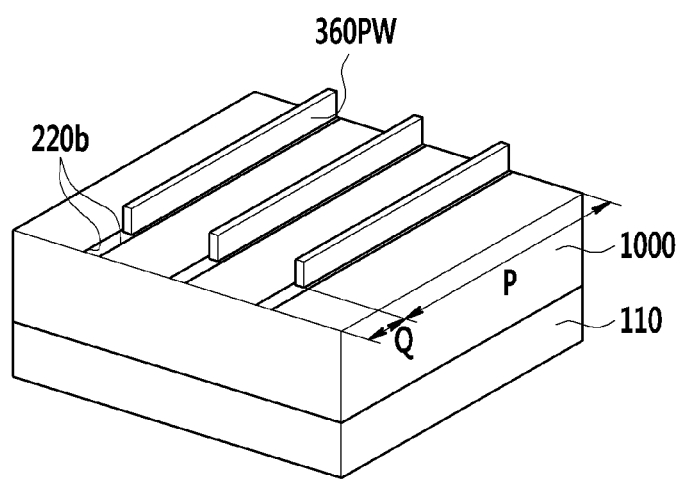

Referring to FIG. 7, a display panel 1000 including a thin film transistor is provided on a substrate 110 in addition to the transfer structure. A manufacturing method of the display panel 1000 will be described in brief with reference to FIG. 1 to FIG. 3 again.

Referring to FIG. 1 to FIG. 3, in order to form a generally known switching element on a substrate 110, the gate line 121 extended in the horizontal direction is formed, the gate insulating layer 140 is formed on the gate line 121, the semiconductor layers 151 and 154 are formed on the gate insulating layer 140, and the source electrode 173 and the drain electrode 175 are formed. In this case, the data line 171 connected with the source electrode 173 may be formed to be extended in the vertical direction while crossing the gate line 121.

The first protection layer 180a is formed on the data conductors 171, 173, and 175 including the source electrode 173, the drain electrode 175, and the data line 171, and the exposed portion of the semiconductor layer 154.

The color filter 230 is formed at a position corresponding to the pixel area on the first protection layer 180a, and the light blocking member 220 is formed between the color filters 230.

The second protection layer 180b covering the color filter 230 and the light blocking member 220 is formed on the color filter 230 and the light blocking member 220, and the second protection layer 180b is formed to have the contact hole 185 electrically and physically connecting the pixel electrode 191 and the drain electrode 175.

Thereafter, the pixel electrode 191 is formed on the second protection layer 180b.

Referring to FIG. 7 again, the partition wall 360PW is formed on the display panel 1000. The partition wall 360PW is formed to overlap the vertical light blocking member 220b corresponding to a light-blocked region. The partition wall 360PW may include a plurality of partition walls 360PW formed to be separated from a first region P corresponding to the pixel area by the width of the pixel area, and may be removed at a second region Q corresponding to the liquid crystal injection hole formation region 307FP which will is described with reference to FIG. 11.

Figure 8:
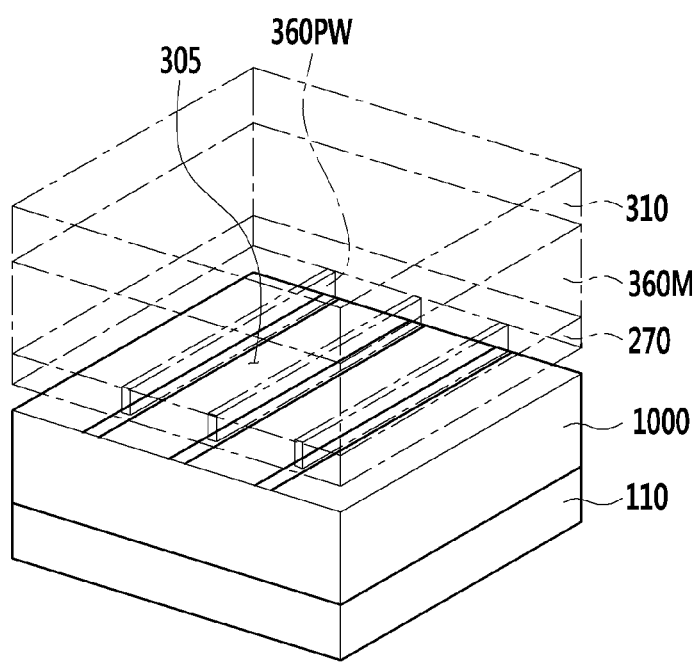

Referring to FIG. 8, the transfer structure 400 described with reference to FIG. 6 is transferred onto the display panel 1000 by using a lamination process. Before this transfer step, the protective film 350 of the transfer structure 400 is removed, and the common electrode 270 is provided on the partition wall 360PW of the display panel 1000. In the transfer step, heat or pressure may be applied. In this case, a plurality of microcavities 305 may be formed in such a way so as to be surrounded by the partition wall 360PW and the original roof layer 360M.

Figure 9:
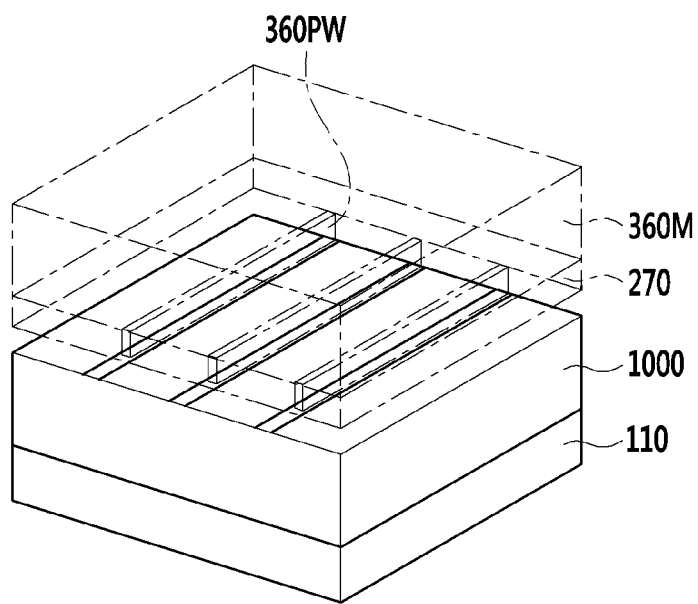

Referring to FIG. 9, the carrier substrate 310 is separated from the transfer structure 400.

Figure 10:
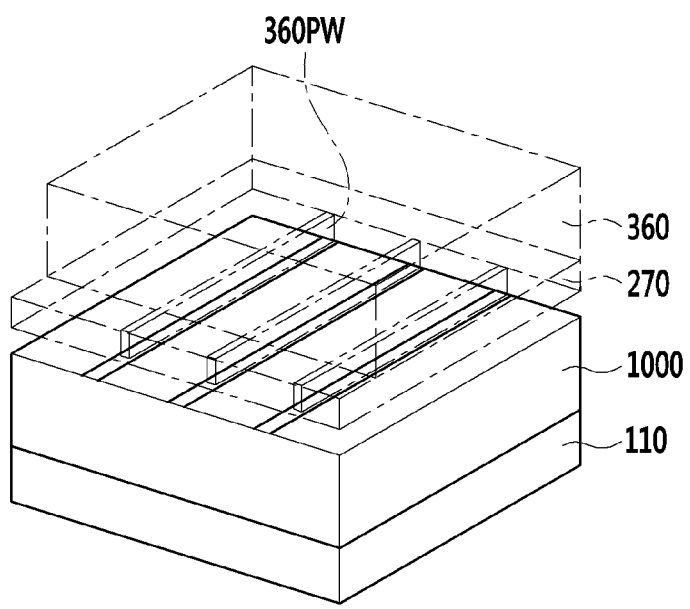

Referring to FIG. 10, the common electrode 270 is partially exposed by removing the original roof layer 360M located at the second region Q described with reference to FIG. 7 by using a photolithography process. In this case, the roof layer 360 is formed at the first region P described with reference to FIG. 7 since the original roof layer 360M located at the second region Q is removed.

Figure 11:
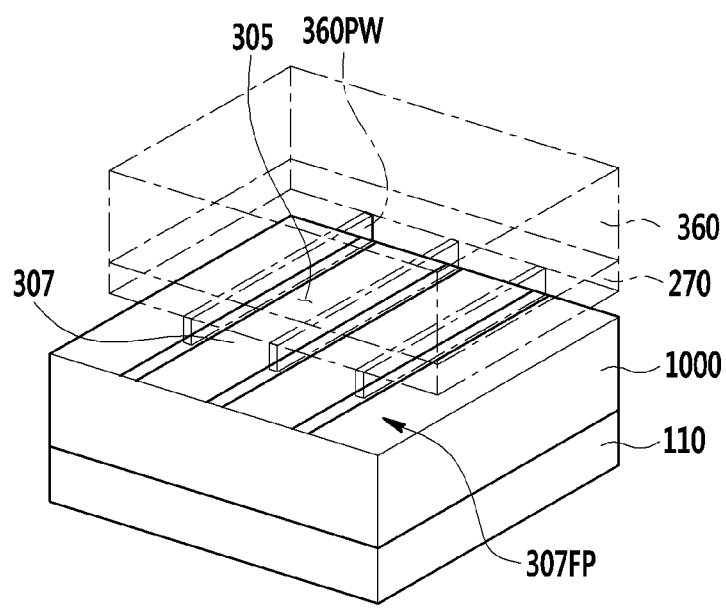

Referring to FIG. 11, an exposed portion of the common electrode 270 is removed by being etched. In this case, the liquid crystal injection hole formation region 307FP may be formed at the second region Q of the display panel 1000 described with reference to FIG. 7. The liquid crystal injection hole formation region 307FP is provided between the microcavities 305.

Figure 12:
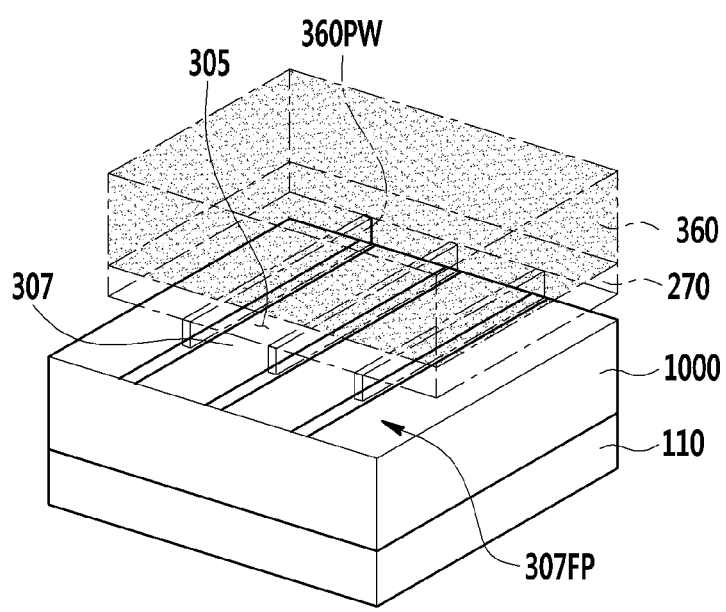

Referring to FIG. 12, durability of the roof layer 360 can be improved by hardening the roof layer 360. Herein, the hardening temperature is in a range of about 150 to about 250° C. Then, the liquid crystal material is dripped into the liquid crystal injection hole formation region 307FP, and then injected into the microcavities 305 through the liquid crystal injection hole 307 provided at an inlet of the microcavities 305. An aligning material may be injected into the microcavities 305 before the injection of the liquid crystal material.

Figure 13:
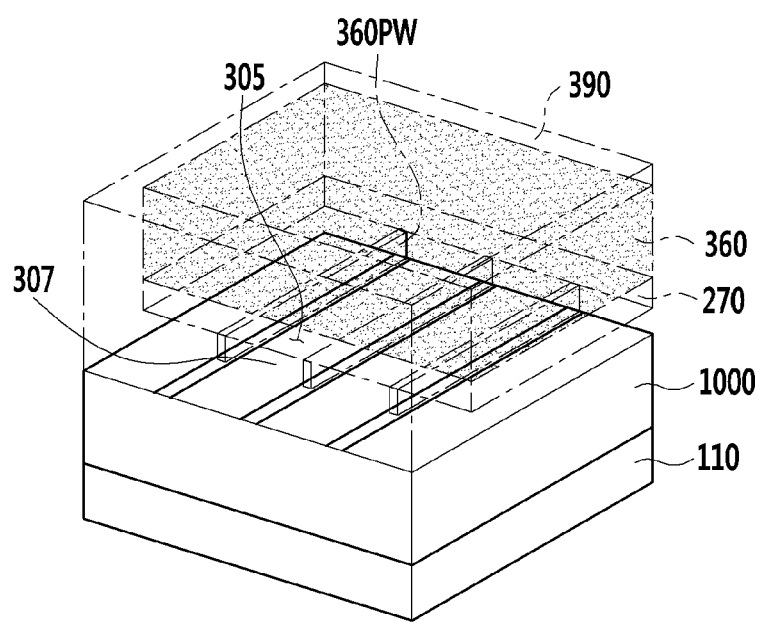

Referring to FIG. 13, a capping layer 390 is formed to fill the liquid crystal injection hole formation region 307FP. Although not shown, a polarizer may be attached to a lower side of the substrate 110 and an upper side of the capping layer 390.

Figure 14:
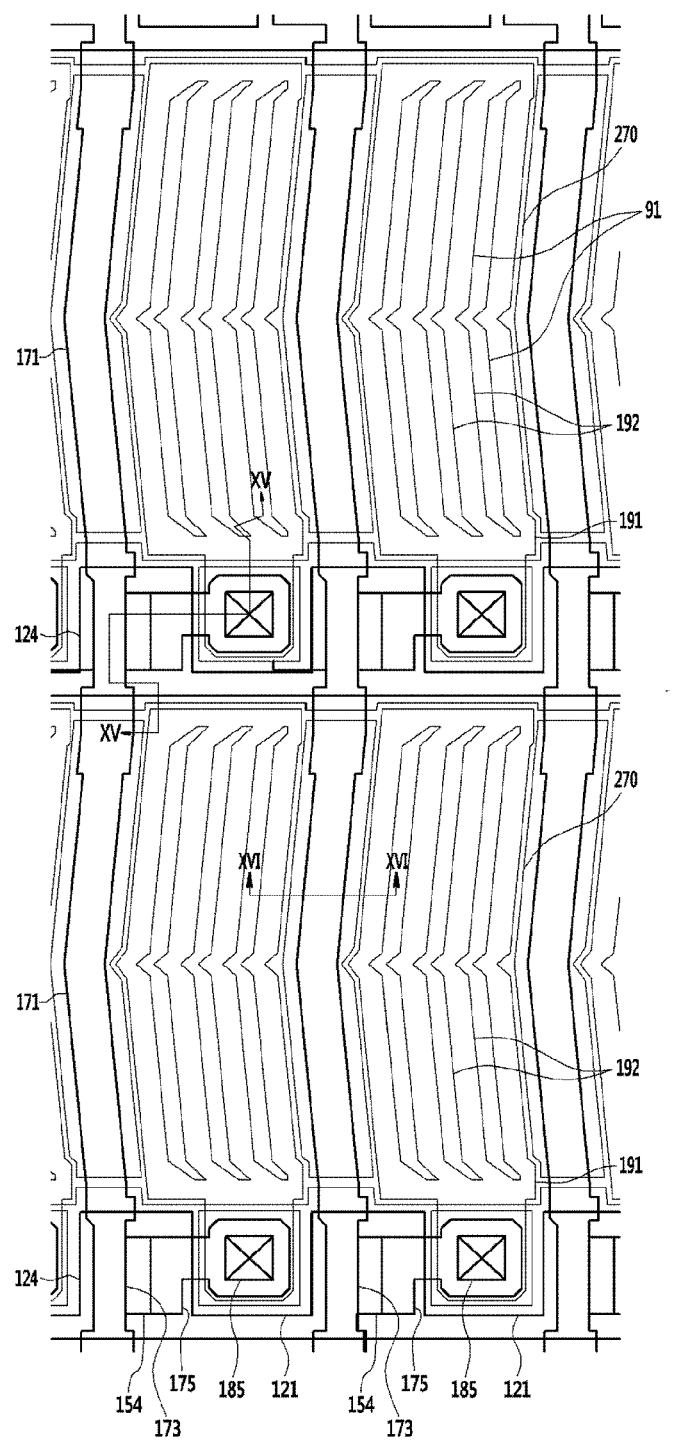
FIG. 14 is a layout view showing a liquid crystal display in accordance with an embodiment.
Figure 15:
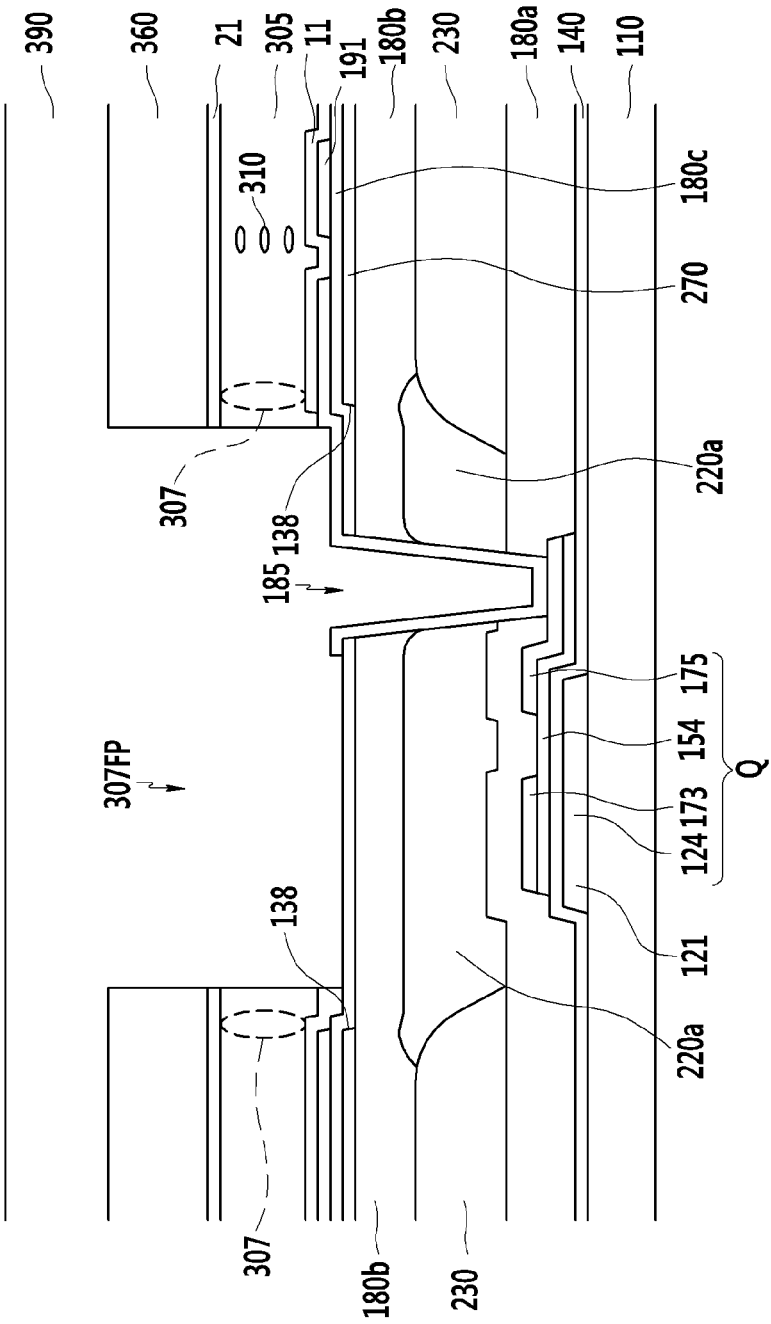
FIG. 15 is a cross-sectional view taken along a line XV-XV of FIG. 14.
Figure 16:
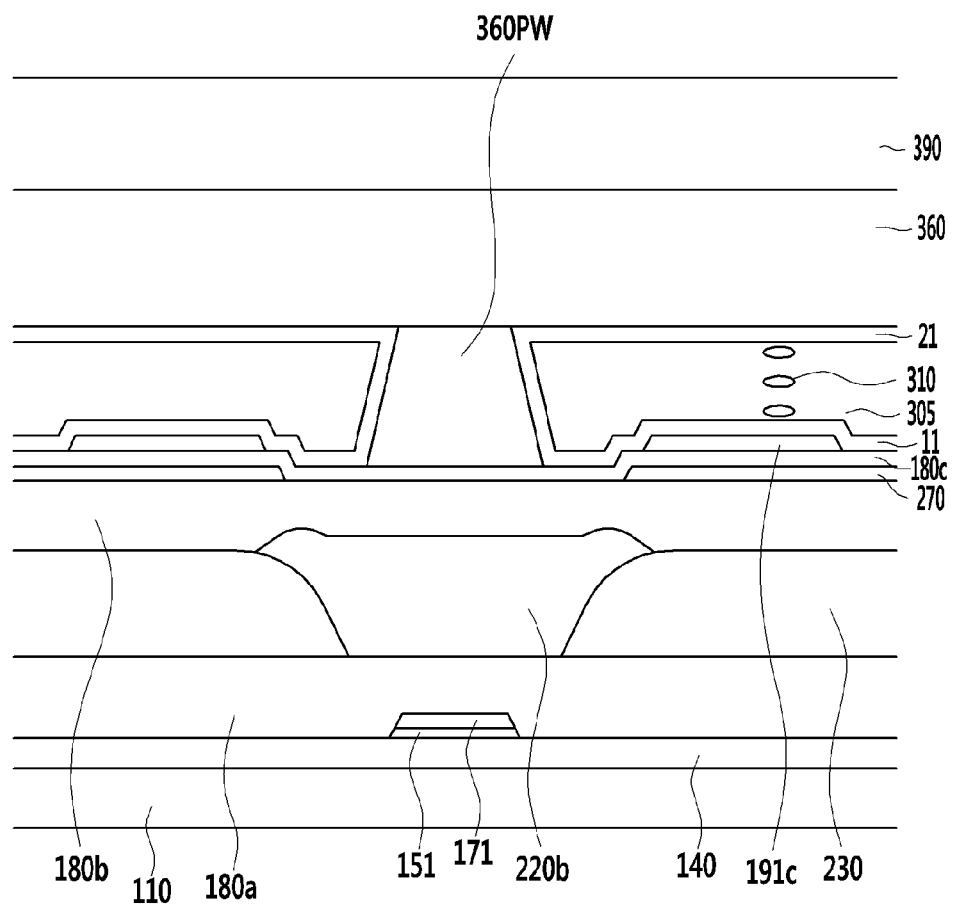
FIG. 16 is a cross-sectional view taken along a line XVI-XVI of FIG. 14.

FIG. 14 is a layout view showing a liquid crystal display in accordance with an embodiment. FIG. 15 is a cross-sectional view taken along a line XV-XV of FIG. 14. FIG. 16 is a cross-sectional view taken along a line XVI-XVI of FIG. 14.

Referring to FIGS. 14 to 16, a gate line 121 is formed on an insulating substrate 110 formed of transparent glass or plastic. The gate line 121 includes a gate electrode 124 and a wide end portion (not illustrated) for a connection with another layer or an external driving circuit. The gate line 121 may be formed of an aluminum-based metal such as, for example, aluminum (Al) or an aluminum alloy, a silver-based metal such as, for example, silver (Ag) or a silver alloy, a copper-based metal such as, for example, copper (Cu) or a copper alloy, a molybdenum-based metal such as, for example, molybdenum (Mo) or a molybdenum alloy, chromium (Cr), tantalum (Ta), and titanium (Ti). However, the gate line 121 may also have a multilayer structure including at least two conductive layers having different physical properties.

The gate insulating layer 140 is formed on the gate line 121. The gate insulating layer 140 may have a multilayer structure including at least two conductive layers having different physical properties. A semiconductor layer 151 disposed at a lower portion of a data line 171, and a semiconductor layer 154 disposed at a lower portion of a source/drain electrode and at a channel portion of a thin film transistor Q, are formed on the gate insulating layer 140. The semiconductor layer 154 may be made of amorphous silicon or polysilicon, or an oxide semiconductor.

A plurality of ohmic contacts may be formed on each of the semiconductor layers 151 and 154, and between the data line 171 and the source/drain electrode, but this is omitted in the drawings.

Data conductors 171, 173, and 175 including a source electrode 173, the data line 171 connected with the source electrode 173, and a drain electrode 175 are formed on each of the semiconductor layers 151 and 154 and the gate insulating layer 140. The data line 171 includes a wide end portion (not illustrated) for connection with another layer or an external driving circuit. The data line 171 transfers a data signal and extends mainly in a vertical direction to cross the gate line 121.

The source electrode 173 is a part of the data line 171, and is disposed on the same line as the data line 171. The drain electrode 175 is formed to extend in parallel with the source electrode 173. Accordingly, the drain electrode 175 is parallel with the part of the data line 171. The structure of the source electrode 173 and the drain electrode 175 may be changed.

The gate electrode 124, the source electrode 173, and the drain electrode 175 form one thin film transistor Q together with the semiconductor 154, and a channel of the thin film transistor is disposed in the semiconductor 154 between the source electrode 173 and the drain electrode 175.

The data line 171 and the drain electrode 175 may be made of a refractory metal such as, for example, molybdenum, chromium, tantalum, and titanium, or an alloy thereof, and may have a multilayered structure including a refractory metal layer (not illustrated) and a low resistance conductive layer (not illustrated). An example of the multilayered structure may include a double layer including a chromium or molybdenum (alloy) lower layer and an aluminum (alloy) upper layer, and a triple layer including a molybdenum (alloy) lower layer, an aluminum (alloy) intermediate layer, and a molybdenum (alloy) upper layer.

A first protection layer 180a is formed on the data conductors 171, 173, and 175 and the exposed semiconductor layer 154. The first protection layer 180a may include an inorganic insulator such as, for example, a silicon nitride (SiNx), a silicon oxide (SiOx), or an organic insulator.

A color filter 230 and a light blocking member 220 are formed on the first protection layer 180a.

First, the light blocking member 220 has a lattice structure having an opening corresponding to a region displaying an image, and is formed of a material preventing light from being transmitted. The color filter 230 is formed at the opening of the light blocking member 220. The light blocking member 220 includes a horizontal light blocking member 220a formed in a direction parallel to the gate line 121 and a vertical light blocking member 220b formed in a direction parallel to the data line 171.

The color filter 230 may display one of the primary colors, such as three primary colors including, for example, red, green, and blue. However, the colors are not limited to the three primary colors including red, green, and blue, and the color filter 230 may also display one among a cyan-based color, a magenta-based color, a yellow-based color, and a white-based color. The color filter 230 may be formed of materials displaying different colors for each adjacent pixel.

A second protection layer 180b covering the color filter 230 and the light blocking member 220 is formed on the color filter 230 and the light blocking member 220. The second protection layer 180b may include an inorganic insulating material, such as, for example, a silicon nitride (SiNx) and a silicon oxide (SiOx), or an organic insulating material. Contrary to the illustration in the cross-sectional view of FIG. 15, in a case where a step is generated due to a difference in a thickness between the color filter 230 and the light blocking member 220, the second protection layer 180b may include an organic insulating material, so that it is possible to decrease or remove the step.

The color filter 230, the light blocking member 220, and the protection layers 180a and 180b have a contact hole 185 exposing the drain electrode 175.

The common electrode 270 is formed on the second protection layer 180b. The common electrode 270 has a planar shape, may be formed on the entire first substrate 110 as a plate, and may have an opening 138 formed in the region corresponding to the periphery of the drain electrode 175. That is, the common electrode 270 may have the planar shape of a plate shape.

The common electrodes 270 disposed on adjacent pixels are connected to each other to receive a common voltage of a predetermined level supplied from outside of the display area.

An interlayer insulating layer 180c is formed on the common electrode 270. The interlayer insulating layer 180c may be formed of an organic insulating material or an inorganic insulating material.

A pixel electrode 191 is disposed on the interlayer insulating layer 180c. The pixel electrode 191 may be formed of a transparent conductive material such as, for example, ITO or IZO. The pixel electrode 191 includes a plurality of cutouts 91 and a plurality of branch electrodes 192 disposed between the adjacent cutouts 91.

The first protection layer 180a, the second protection layer 180b, and the interlayer insulating layer 180c have a contact hole 185 exposing the drain electrode 175. The pixel electrode 191 is physically and electrically connected to the drain electrode 175 through the first contact hole 185 to receive a voltage from the drain electrode 175.

The common electrode 270 is a first field generating electrode or a first electrode, and the pixel electrode 191 is a second field generating electrode or a second electrode. The pixel electrode 191 and the common electrode 270 may form a horizontal electric field. The pixel electrode 191 and the common electrode 270 as field generating electrodes generate an electrical field such that the liquid crystal molecules 310 disposed thereon are rotated in a direction parallel to the direction of the electric field. As such, according to the determined rotation direction of the liquid crystal molecules, the polarization of light passing through the liquid crystal layer is changed.

According to the liquid crystal display of the shown embodiment, the common electrode 270 has the planar shape and the pixel electrode 191 has a plurality of branch electrodes, however according to a liquid crystal display of another embodiment, the pixel electrode 191 may have a planar shape and the common electrode 270 may have a plurality of branch electrodes.

Embodiments may be applied to all cases in which two field generating electrodes overlap via the insulating layer on the substrate 110, the first field generating electrode under the insulating layer has the plane shape, and the second field generating electrode on the insulating layer has a plurality of branch electrodes.

A lower alignment layer 11 is formed on the pixel electrode 191. The lower alignment layer 11 as a liquid crystal alignment layer made of a material such as, for example, polyamic acid, polysiloxane, polyimide, or the like, may include at least one of generally used materials, or a photo-alignment material.

An upper alignment layer 21 is disposed at a portion facing the lower alignment layer 11, and a microcavity 305 is formed between the lower alignment layer 11 and the upper alignment layer 21. The upper alignment layer 21 may be formed of the same material as that of the lower alignment layer 11. A liquid crystal material including liquid crystal molecules 310 is injected into the microcavity 305 through a liquid crystal injection hole 307.

The microcavity 305 may be formed in a column direction, that is, a vertical direction, of the pixel electrode 191. In one embodiment, the alignment material forming the alignment layers 11 and 21 and the liquid crystal material including the liquid crystal molecules 310 may be injected into the microcavity 305 by using capillary force.

The microcavity 305 is divided in a vertical direction by a plurality of liquid crystal injection hole formation regions 307FP disposed at a portion overlapping the gate line 121, and a plurality of microcavities 305 may be formed along the direction in which the gate line 121 is extended. Each of the plurality of formed microcavities 305 may correspond to a pixel area, and the pixel areas may correspond to a region displaying an image.

A roof layer 360 is provided on the upper alignment layer 21. The roof layer 360 serves as a support member so that the microcavity 305 is formed. The roof layer 360 may include a dry film. The dry film may be a filmed photosensitive resist, and may be mainly made of a material used for forming a circuit of a printed circuit substrate. The dry film has outstanding adherence and flatness, and thus the dry film is appropriately used as the roof layer 360 in the liquid crystal display in accordance with one embodiment.

A capping layer 390 is provided on the roof layer 360. In one embodiment, the capping layer 390 fills the liquid crystal injection hole formation region 307FP and covers the liquid crystal injection hole 307 of the microcavity 305 exposed by the liquid crystal injection hole formation region 307FP. The capping layer 390 includes an organic material or an inorganic material.

In one embodiment, the capping layer 390 may be brought into contact with a side surface and an upper surface of the roof layer 360.

In one embodiment, as shown in FIG. 16, a partition wall 360PW is disposed between the microcavities 305 adjacent to each other in a horizontal direction. The partition wall 360PW is formed in an extending direction of the data line 171, and the common electrode 270 is provided between the partition wall 360PW and the roof layer 360. A width of the partition wall 360PW may become narrower from the substrate 110 toward the roof layer 360. The partition wall 360PW may include a transparent inorganic material or a transparent organic material which can be used in a column space serving as a constituent element for maintaining a cell gap in a conventional liquid crystal display.

The partition wall 360PW can partition or define the microcavities 305. In one embodiment, since the partition wall 360PW is formed between the microcavities 305, more stress may be generated even when the substrate 110 is bent, and the deformation level of cell gap may be further reduced.

Hereinafter, a manufacturing method of the liquid crystal display described with reference to FIG. 14 to FIG. 16 will be described with reference to FIG. 17 to FIG. 24 in accordance with one embodiment.

FIG. 17 to FIG. 24 are stepwise perspective views showing a manufacturing method of a liquid crystal display in accordance with one embodiment.

Figure 17:
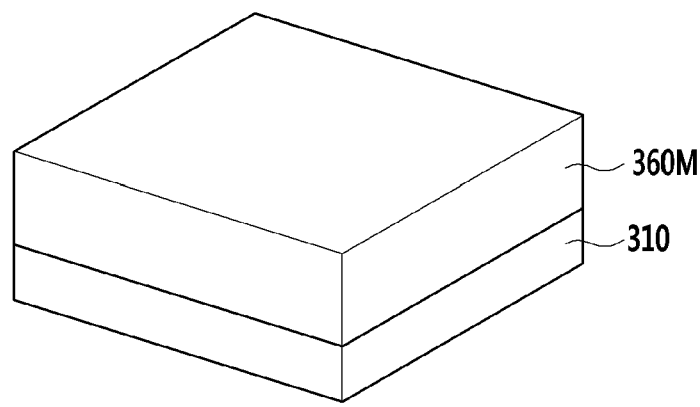
FIG. 17 to FIG. 24 are stepwise perspective views showing a manufacturing method of a liquid crystal display in accordance with an embodiment.
Figure 18:
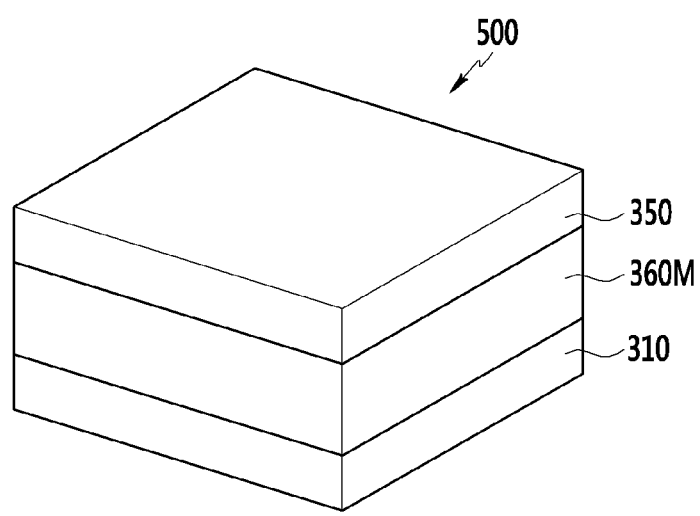

Referring to FIG. 17 and FIG. 18, an original roof layer 360M is formed on a substrate 310, and a protective film 350 is formed on the original roof layer 360M to form a transfer structure 500. The original roof layer 360M is formed of a dry film such as, for example, a filmed photosensitive resist.

Figure 19:
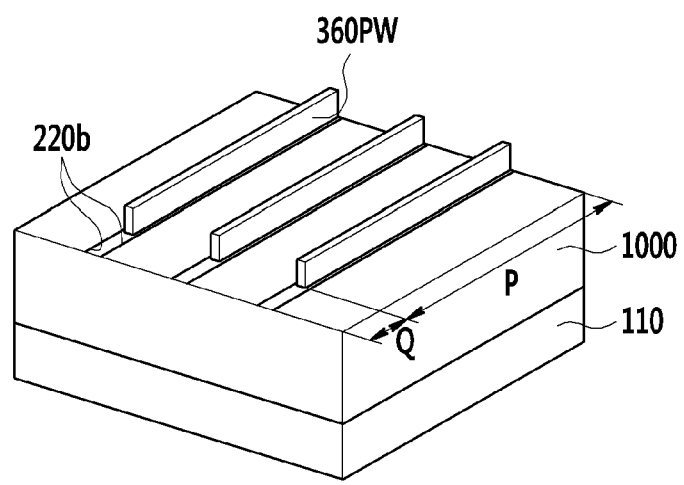

Referring to FIG. 19, a display panel 1000 including a thin film transistor is provided on a substrate 110 in addition to the transfer structure 500. A manufacturing method of the display panel 1000 will be described in brief with reference to FIG. 14 to FIG. 16 again.

Referring to FIG. 14 to FIG. 16, in order to form a generally known switching element on a substrate 110, the gate line 121 extended in the horizontal direction is formed, and the gate insulating layer 140 is formed on the gate line 121, the semiconductor layers 151 and 154 are formed on the gate insulating layer 140, and the source electrode 173 and the drain electrode 175 are formed. In this case, the data line 171 connected with the source electrode 173 may be formed to be extended in the vertical direction while crossing the gate line 121.

A first protection layer 180a is formed on the data conductors 171, 173, and 175 including the source electrode 173, the drain electrode 175, and the data line 171, and the exposed portion of the semiconductor layer 154.

The color filter 230 is formed at a position corresponding to the pixel area on the first protection layer 180a, and the light blocking member 220 is formed between the color filters 230.

A second protection layer 180b covering the color filter 230 and the light blocking member 220 is formed on the color filter 230 and the light blocking member 220, and the second protection layer 180b is formed to have the contact hole 185 electrically and physically connecting the pixel electrode 191 and the drain electrode 175.

Next, the common electrode 270 of the planar shape is formed on the second protection layer 180b. The common electrode 270 has the opening 138 disposed at the portion overlapping the gate line 121 or the data line 171, but may be formed to be connected in the adjacent pixels. The interlayer insulating layer 180c is formed on the common electrode 270, and the interlayer insulating layer 180c is formed on the pixel electrode 191. The interlayer insulating layer 180c has the contact hole 185 physically and electrically connecting the pixel electrode 191 and the drain electrode 175 along with the first protection layer 180a and the second protection layer 180b.

The pixel electrode 191 includes a plurality of cutouts 91 and a plurality of branch electrodes 192 disposed between the adjacent cutouts 91.

Referring to FIG. 19 again, the partition wall 360PW is formed on the display panel 1000. The partition wall 360PW is formed to overlap the vertical light blocking member 220b corresponding to a light-blocked region. The partition wall 360PW may include a plurality of partition walls 360PW formed to be separated from a first region P corresponding to the pixel area by the width of the pixel area, and may be removed at a second region Q corresponding to the liquid crystal injection hole formation region 307FP which will is described with reference to FIG. 22.

Figure 20:
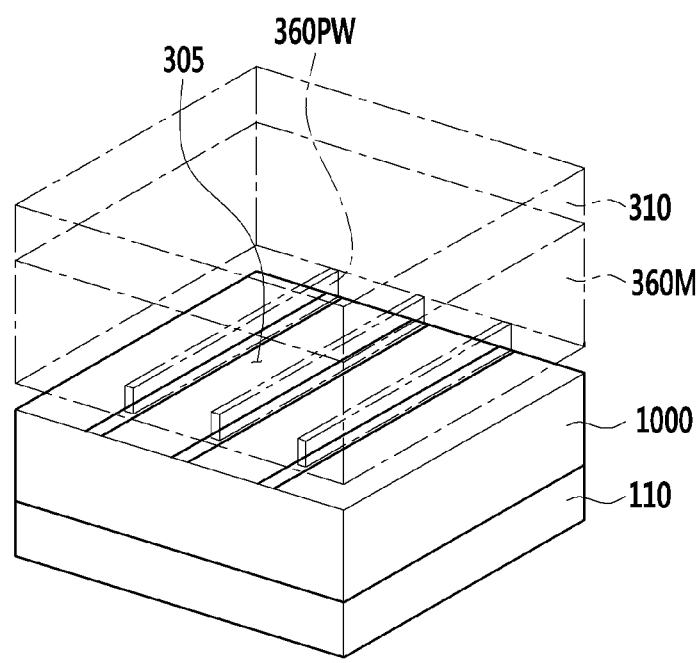

Referring to FIG. 20, the transfer structure 500 described with reference to FIG. 18 is transferred onto the display panel 1000 by using a lamination process. Before this transfer step, the protective film 350 of the transfer structure 500 is removed, and the original roof layer 360M is provided on the partition wall 360PW of the display panel 1000. In the transfer step, heat or pressure may be applied. In this case, a plurality of microcavities 305 may be formed in such a way so as to be surrounded by the partition wall 360PW and the original roof layer 360M.

Figure 21:
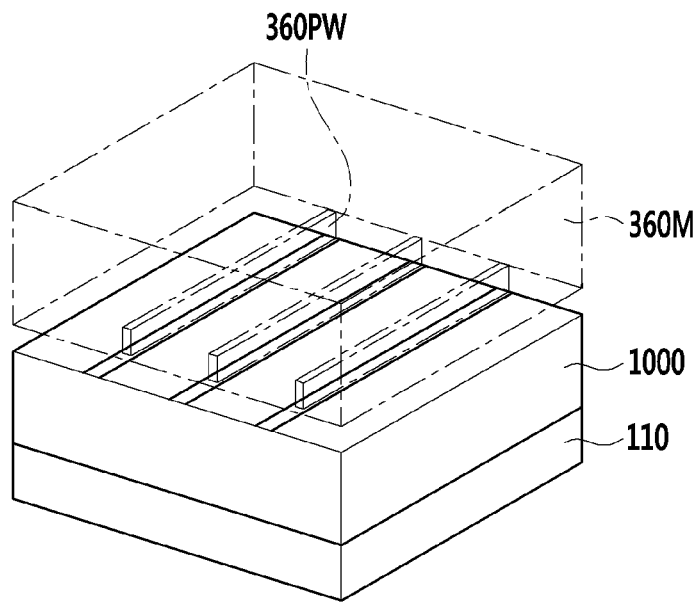

Referring to FIG. 21, the carrier substrate 310 is separated from the transfer structure 500.

Figure 22:
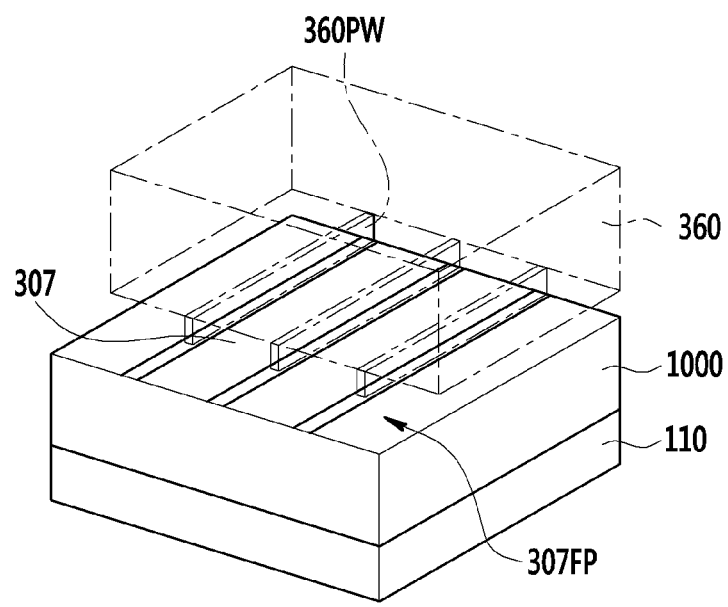

Referring to FIG. 22, the roof layer 360 is formed at the first region P described with reference to FIG. 19 by removing the original roof layer 360M located at the second region Q described with reference to FIG. 19 by using a photolithography process. In this case, the liquid crystal injection hole formation region 307FP may be formed at the second region Q of the display panel 1000 described with reference to FIG. 19. The liquid crystal injection hole formation region 307FP is provided between the microcavities 305.

Figure 23:
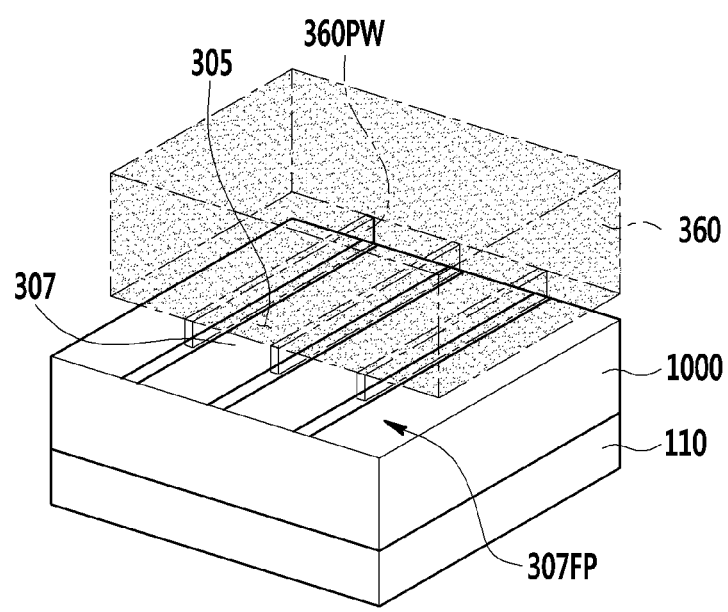

Referring to FIG. 23, durability of the roof layer 360 can be improved by hardening the roof layer 360. Herein, the hardening temperature is in a range of about 150 to about 250° C. Then, the liquid crystal material is dripped into the liquid crystal injection hole formation region 307FP, and then injected into the microcavities 305 through the liquid crystal injection hole 307 provided at an inlet of the microcavities 305. An aligning material may be injected into the microcavities 305 before the injection of the liquid crystal material.

Figure 24:
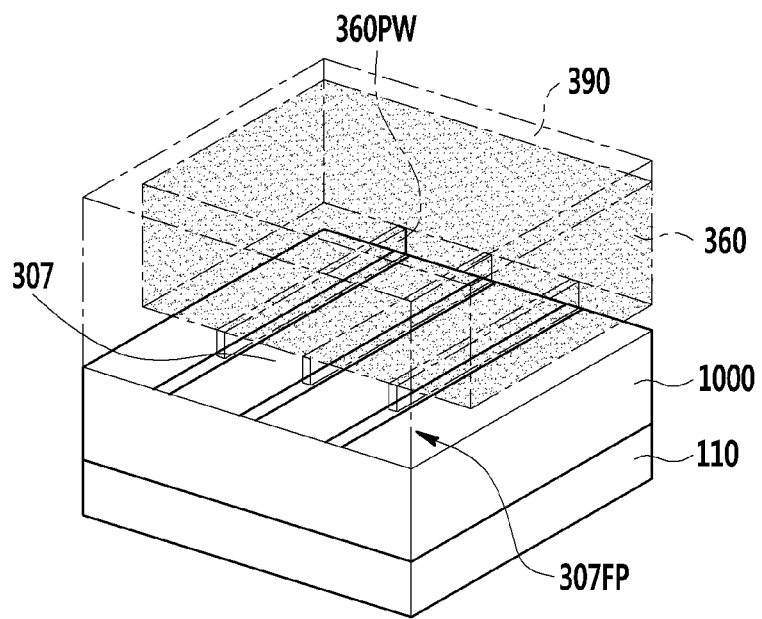

Referring to FIG. 24, a capping layer 390 is formed to fill the liquid crystal injection hole formation region 307FP. Although not shown, a polarizer may be attached to a lower side of the substrate 110 and an upper side of the capping layer 390.

Figure 25:
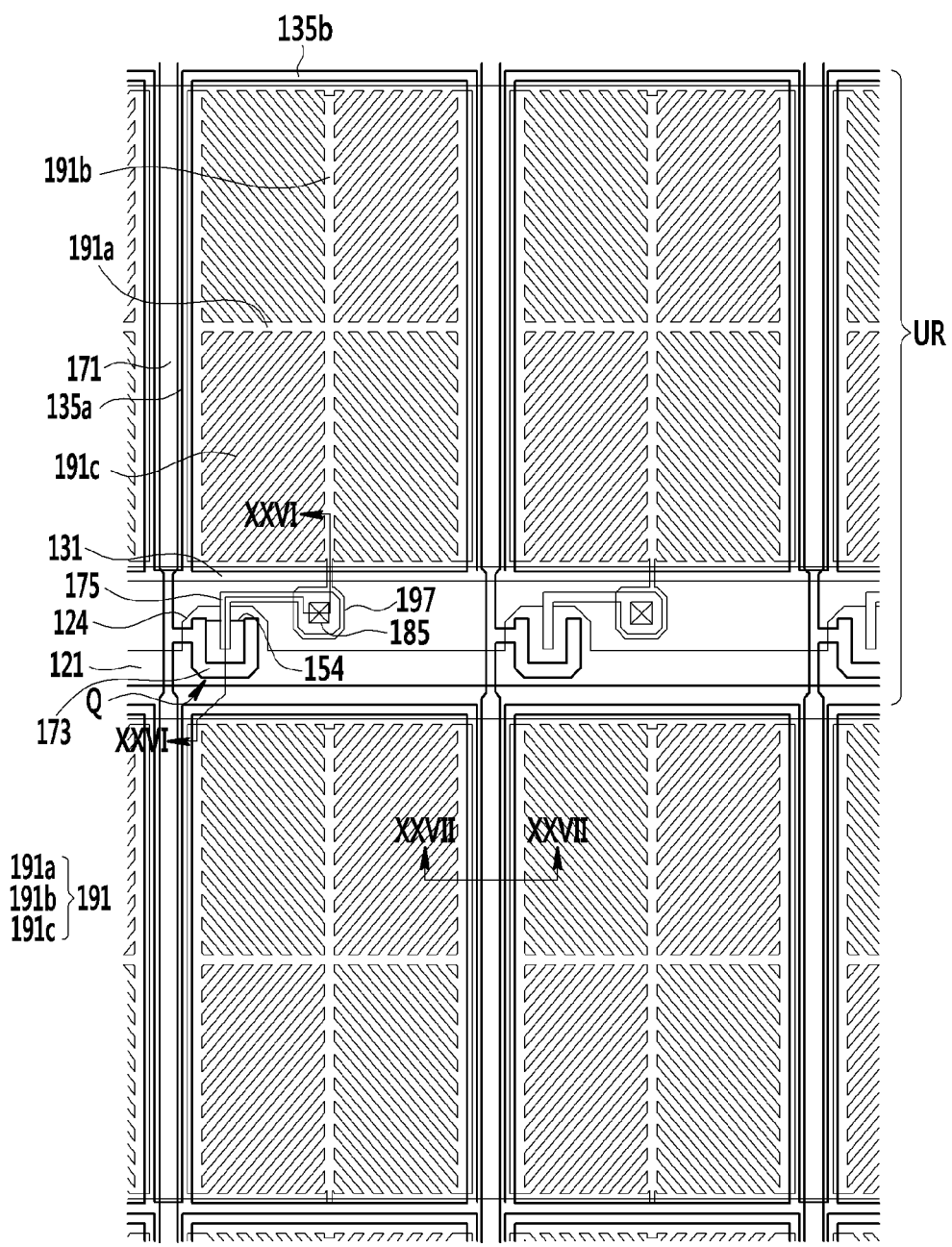
FIG. 25 is a layout view showing a liquid crystal display in accordance with an embodiment.
Figure 26:
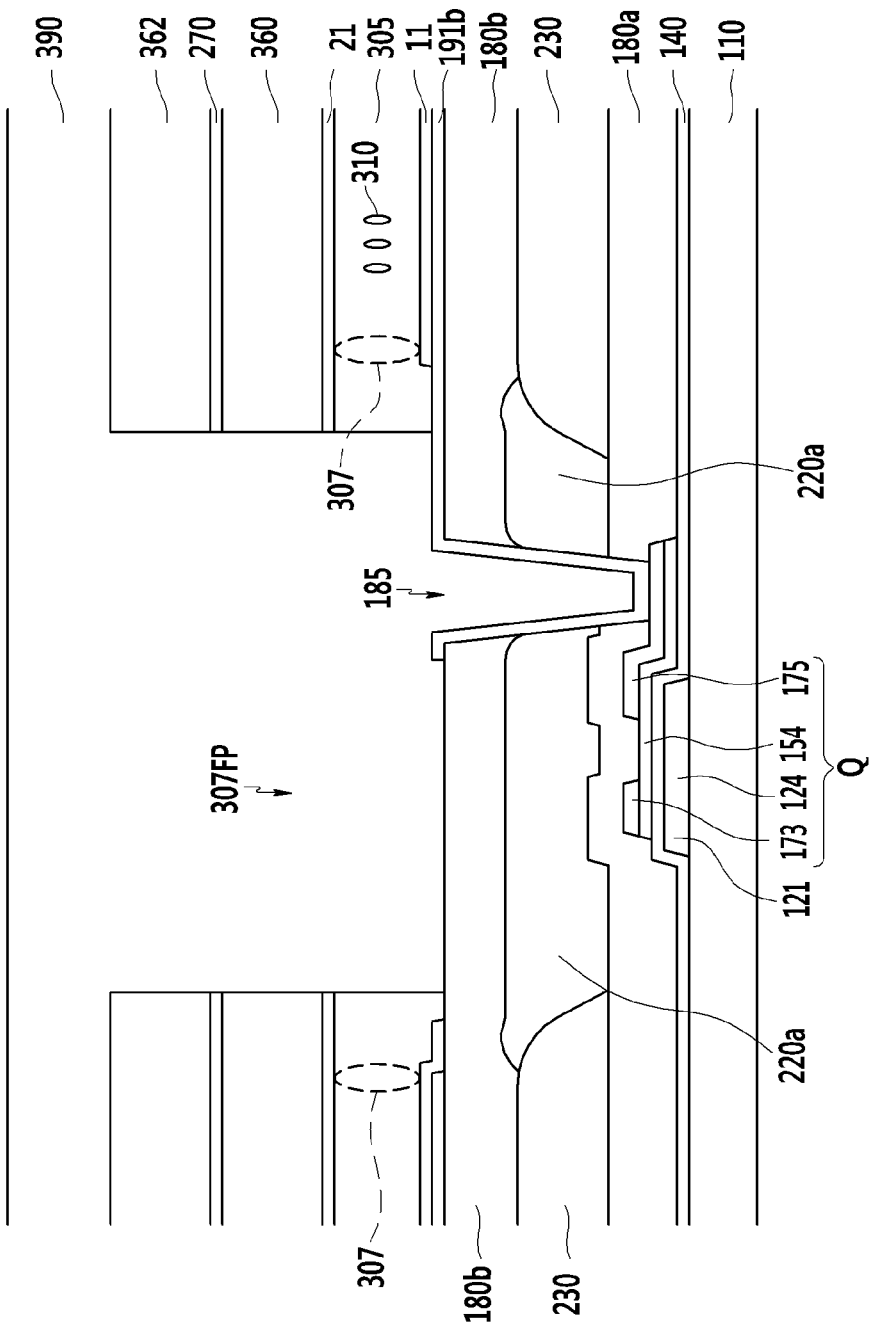
FIG. 26 is a cross-sectional view taken along a line XXVI-XXVI of FIG. 25.
Figure 27:
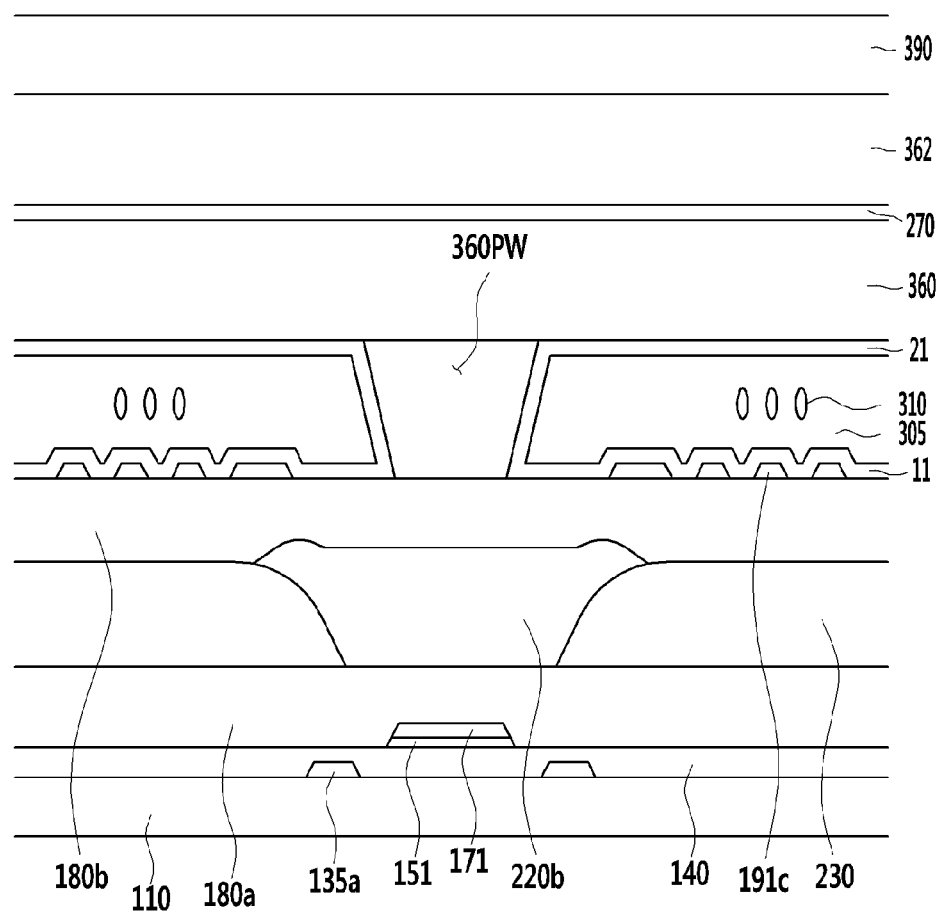
FIG. 27 is a cross-sectional view taken along a line XXVII-XXVII of FIG. 27.

FIG. 25 is a layout view showing a liquid crystal display in accordance with one embodiment. FIG. 26 is a cross-sectional view taken along a line XXVI-XXVI of FIG. 25. FIG. 27 is a cross-sectional view taken along a line XXVII-XXVII of FIG. 27.

The embodiment to be described with reference to FIG. 25 to FIG. 27 is substantially the same as the embodiment described with reference to FIG. 1 to FIG. 3, and thus only the difference therebetween is described below.

Referring to FIG. 25 to FIG. 27, the roof layer 360 is provided on the upper alignment layer 21, and the common electrode 270 is provided on the roof layer 360. An upper roof layer 362 is provided on the common electrode 270. The upper roof layer 362 may serve to protect the common electrode 270, and may be formed of the same material as that of the roof layer 360, or may be a photoresist including an organic material instead of a dry film. The capping layer 390 may be provided on the upper roof layer 362.

Referring to FIG. 27, in one embodiment, the partition wall 360PW and the roof layer 360 include a dry film, and serve as an integrally formed structure. A width of the partition wall 360PW may be wider from the substrate 110 toward the roof layer 360.

All the description given with reference to FIG. 1 to FIG. 3 can be applied to the embodiment of FIG. 25 to FIG. 27, except for the differences.

Hereinafter, a manufacturing method of the liquid crystal display described with reference to FIG. 25 to FIG. 27 will be described with reference to FIG. 28 to FIG. 37 in accordance with one embodiment.

FIG. 28 to FIG. 37 are stepwise perspective views showing a manufacturing method of a liquid crystal display in accordance with one embodiment. FIG. 28 to FIG. 37 show a unit region UR (as shown in FIG. 25) as a part of an entire pixel area.

Figure 28:
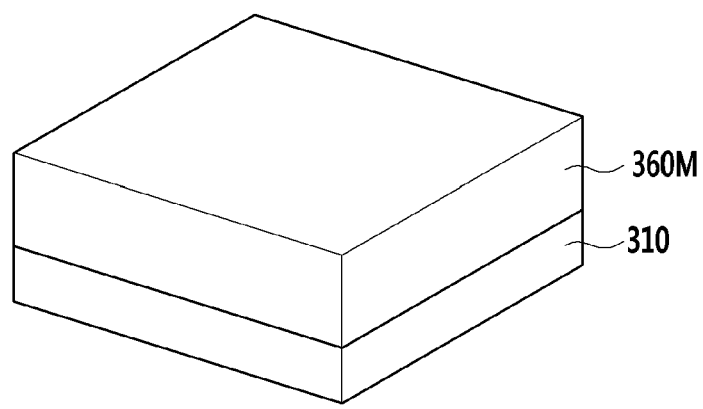
FIG. 28 to FIG. 37 are stepwise perspective views showing a manufacturing method of a liquid crystal display in accordance with an embodiment.
Figure 29:
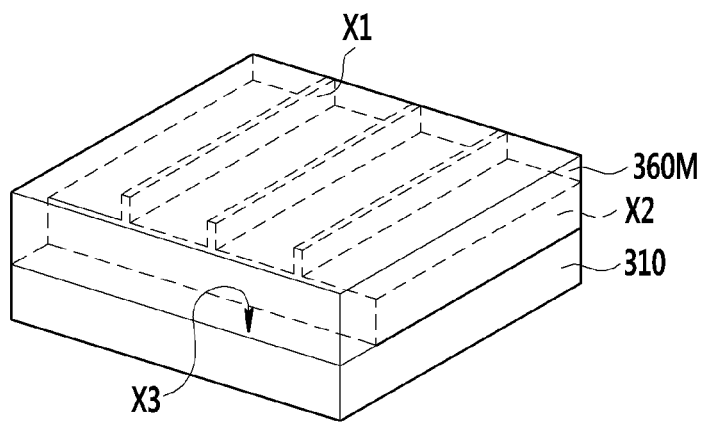

Referring to FIG. 28 and FIG. 29, the original roof layer 360M is formed on the carrier substrate 310, and the original roof layer 360M is exposed to have a pattern indicated by the dotted line in the following development step. The exposure amount may be varied depending on each region such that the original roof layer 360M has the pattern indicated by the dotted line. For example, a region at which a partition wall is formed is referred to as a first region X1, a region at which a roof layer is formed is referred to as a second region X2, and a region at which the liquid crystal injection hole formation region is formed is referred to as a third region X3. Then, light can be irradiated by using, for example, a slit mask or a halftone mask such that the light is blocked at the first region X1 and the exposure amount of the third region X3 is larger than that of the second region X2. In the case of the positive resist, the third region X3 to which the most light is irradiated may have the most portions which are removed, the second region X2 may remain as much as the thickness of the roof layer, and the first region X1 at which the light is blocked may be formed into a partition wall.

The original roof layer 360M is formed of the same dry film as that of the filmed photosensitive resist.

Figure 30:
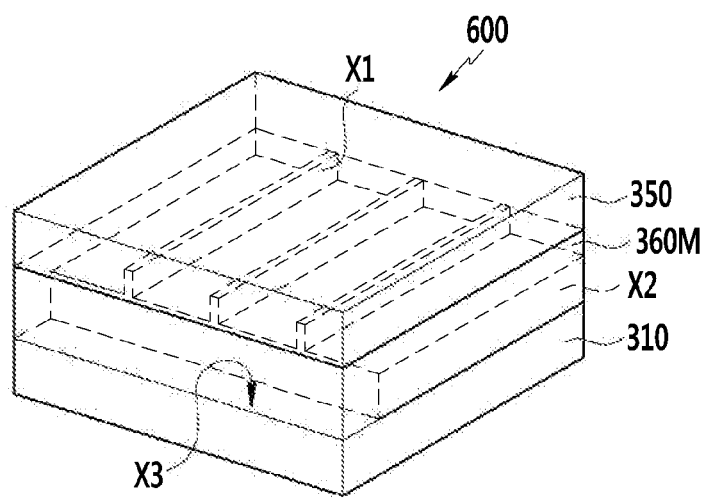

Referring to FIG. 30, a protective film 350 is formed above the original roof layer 360M to form a transfer structure 600.

Figure 31:
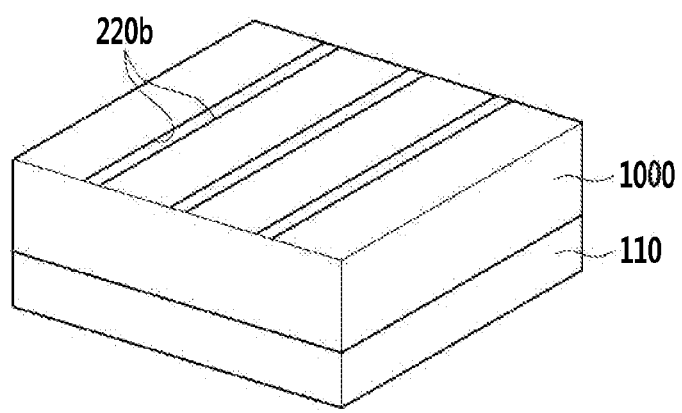

Referring to FIG. 31, a display panel 1000 including a thin film transistor is provided on a substrate 110 in addition to the transfer structure 600. The same part of the manufacturing method of the display panel 1000 as that described with reference to FIG. 1 to FIG. 3 is not provided.

Figure 32:
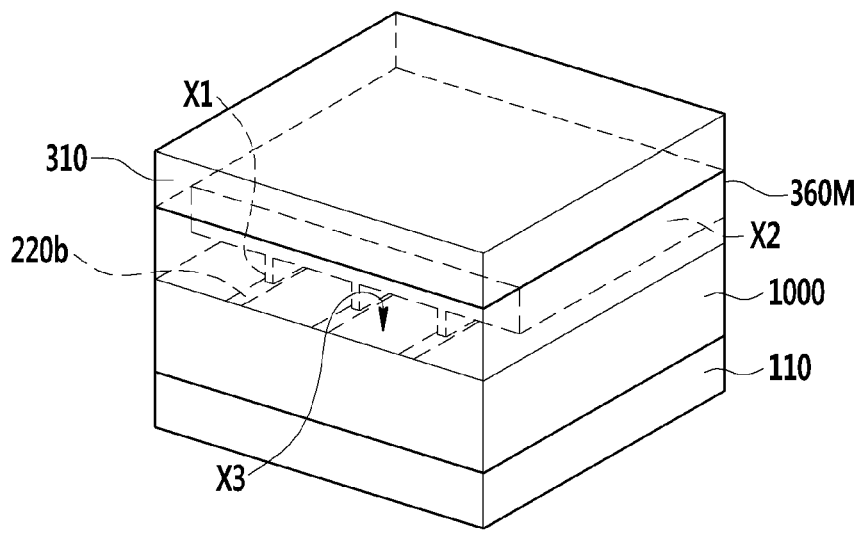

Referring to FIG. 32, the transfer structure 600 described with reference to FIG. 30 is transferred onto the display panel 1000 by using a lamination process. Before this transfer step, the protective film 350 of the transfer structure 600 is removed, and a first region X1 at which a partition wall is to be formed is disposed to correspond to the vertical light blocking member 220b of the display panel 1000. In the transfer step, heat or pressure may be applied.

Figure 33:
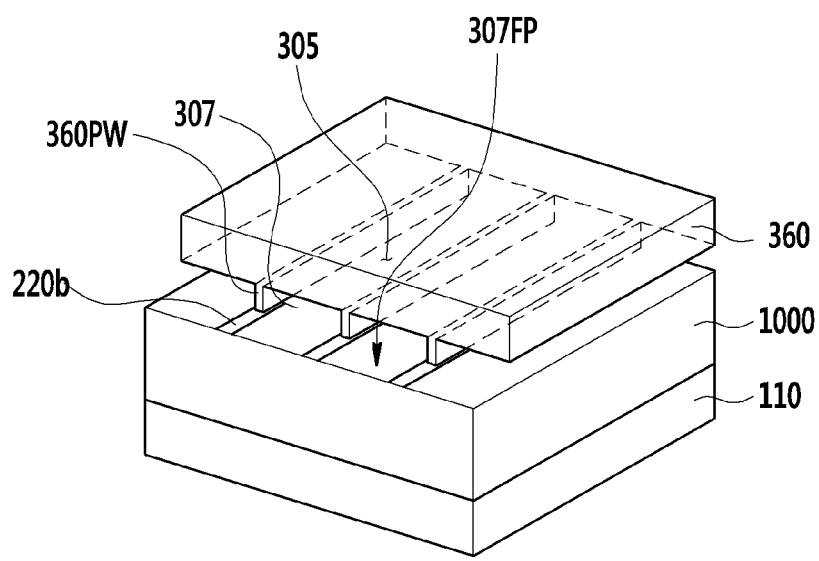

Referring to FIG. 33, the carrier substrate 310 is separated from the transfer structure 600, and the roof layer 360, the partition wall 360PW, and the liquid crystal injection hole formation region 307FP are formed by developing the original roof layer 360M. In this case, a plurality of microcavities 305 surrounded by the roof layer 360 and the partition wall 360PW may be formed.

Figure 34:
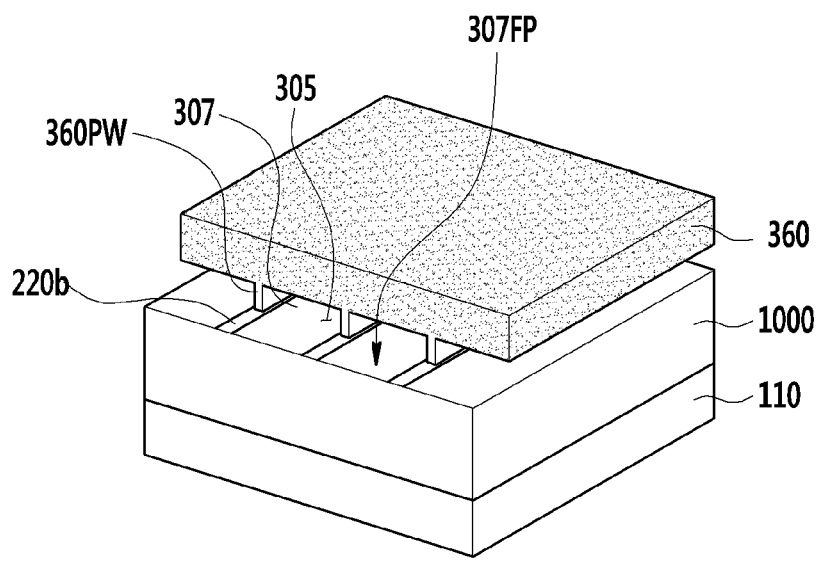

Referring to FIG. 34, durability of the roof layer 360 can be improved by hardening the roof layer 360. Herein, the hardening temperature is in a range of about 150 to about 250° C.

Figure 35:
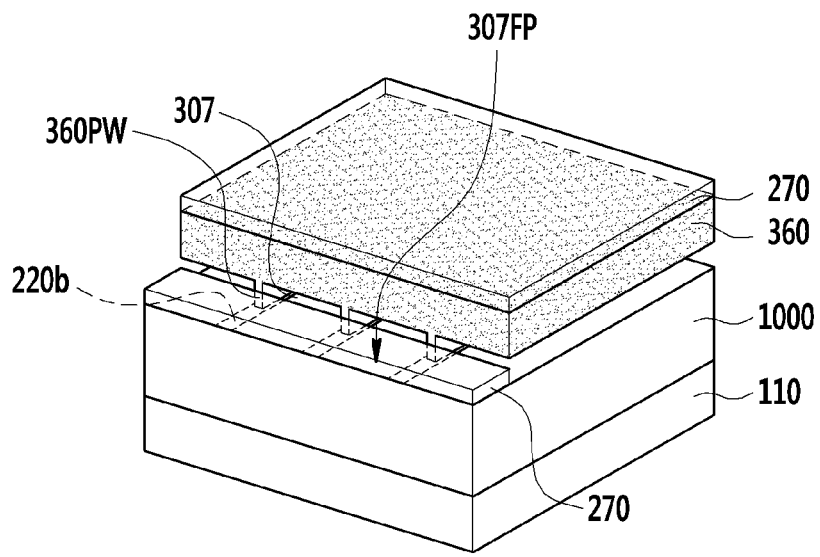

Referring to FIG. 35, the common electrode 270 is formed on the roof layer 360. In this case, the common electrode 270 may also be formed at the liquid crystal injection hole formation region 307FP.

Figure 36:
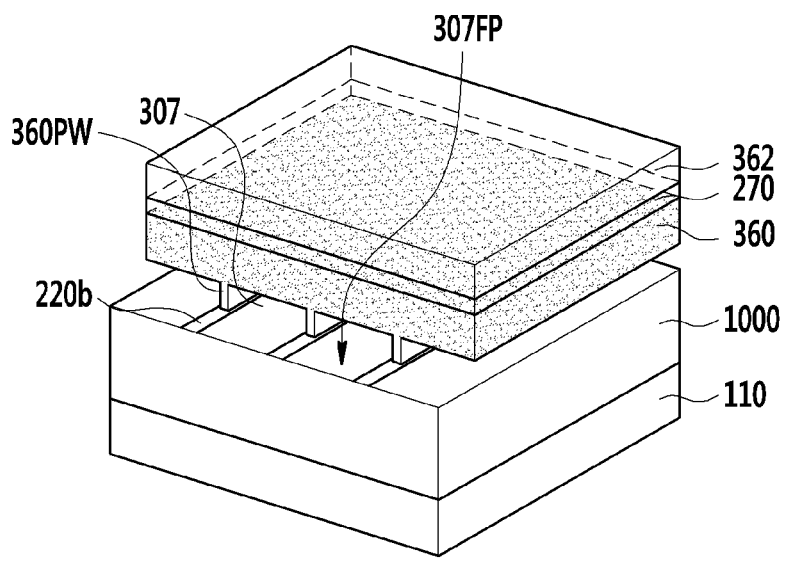

Referring to FIG. 36, an upper roof layer 362 is formed on the common electrode 270, and the common electrode 270 formed at the liquid crystal injection hole formation region 307FP can be removed by using the upper roof layer 362 as a mask. Then, the liquid crystal material is dripped into the liquid crystal injection hole formation region 307FP, and then injected into the microcavities 305 through the liquid crystal injection hole 307 provided at an inlet of the microcavities 305. An aligning material may be injected into the microcavities 305 before the injection of the liquid crystal material.

Figure 37:
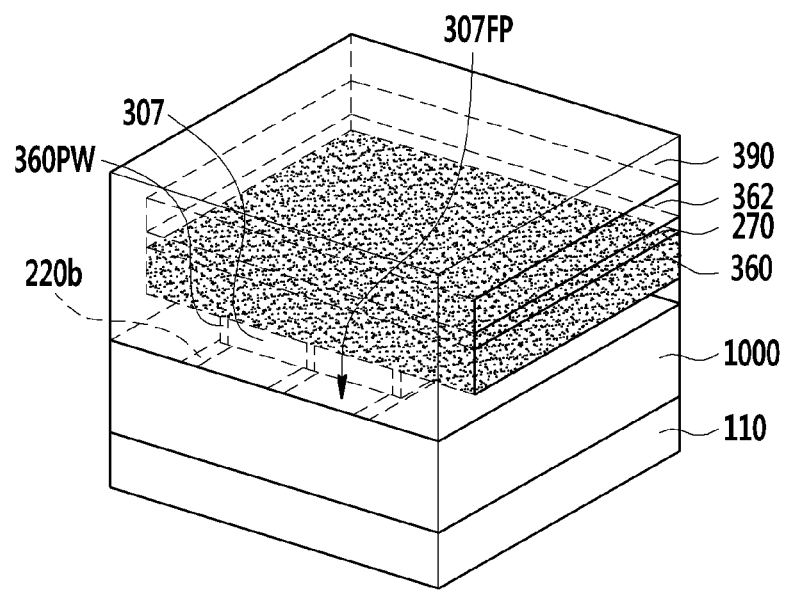

Referring to FIG. 37, a capping layer 390 is formed to fill the liquid crystal injection hole formation region 307FP. Although not shown, a polarizer may be attached to a lower side of the substrate 110 and an upper side of the capping layer 390.

Hereinafter, a manufacturing method of the liquid crystal display described with reference to FIG. 25 to FIG. 27 will be described with reference to FIG. 38 to FIG. 44 in accordance with one embodiment.

FIG. 38 to FIG. 44 are stepwise perspective views showing a manufacturing method of a liquid crystal display in accordance with one embodiment.

The embodiment to be described with reference to FIG. 38 to FIG. 44 is substantially the same as the embodiment described with reference to FIG. 28 to FIG. 37, and thus only the difference therebetween is described below.

Figure 38:
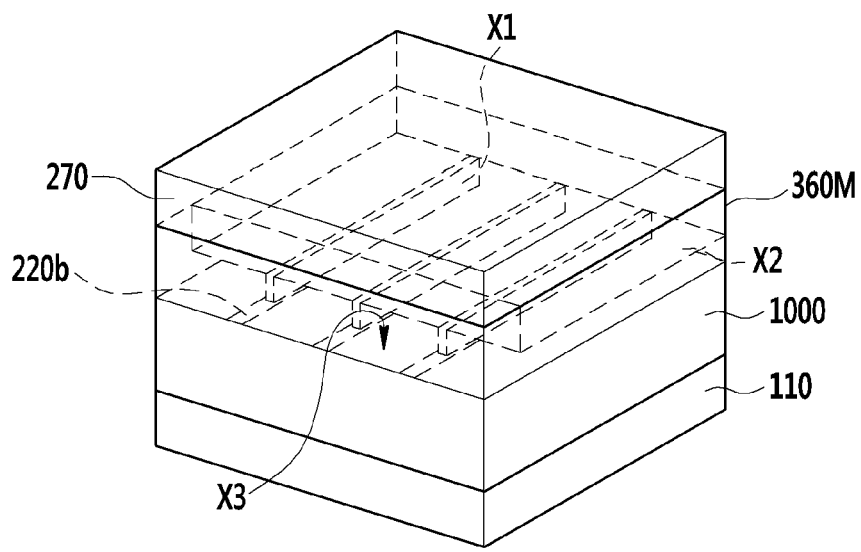
FIG. 38 to FIG. 44 are stepwise perspective views showing a manufacturing method of a liquid crystal display in accordance with an embodiment.

Referring to FIG. 38, a transfer structure exposed to have a pattern indicated by a dotted line similar to the manufacturing method of the liquid crystal display described with reference to FIG. 28 to FIG. 33 is transferred on to the display panel 1000 including a thin film transistor. Next, the common electrode 270 is formed on the original roof layer 360M.

Figure 39:
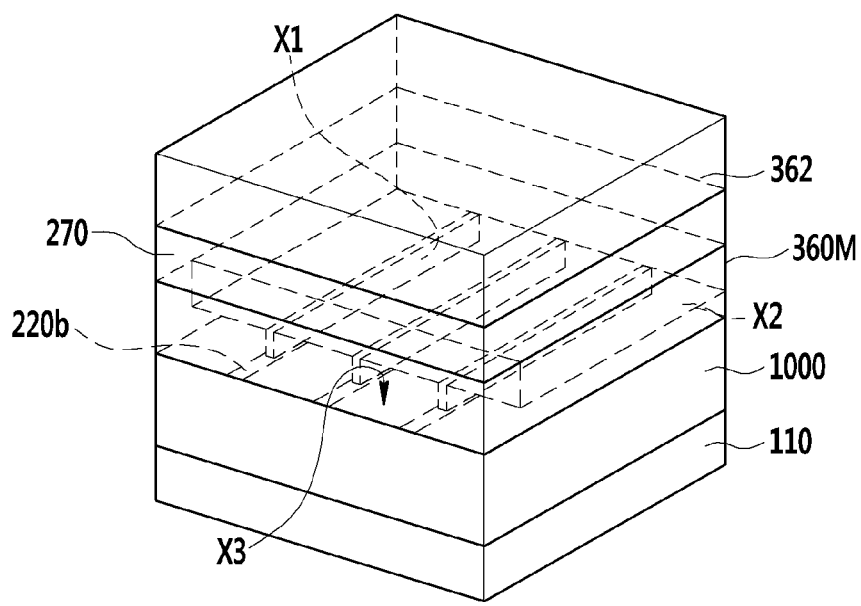
Figure 40:
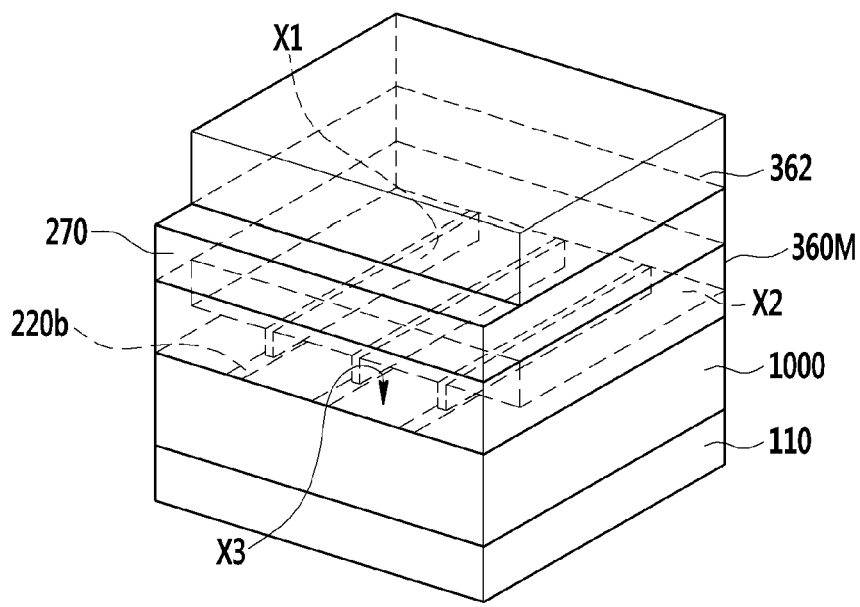
Figure 41:
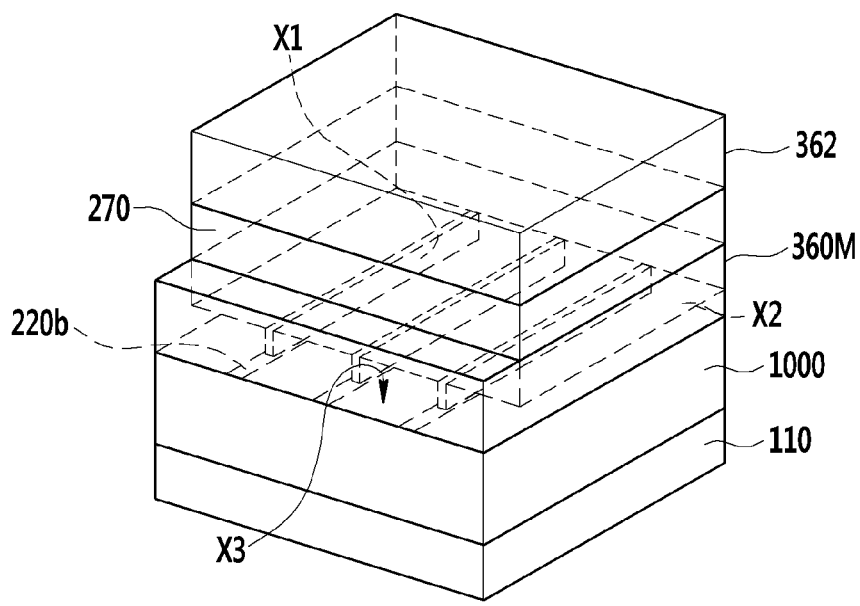

Referring to FIG. 39 to FIG. 41, an upper roof layer 362 is formed on the common electrode 270. The upper roof layer 362 is patterned to expose the common electrode 270 at a region corresponding to the third region X3 at which the liquid crystal injection hole formation region is formed. Next, the original roof layer 360M is exposed at the third region X3 at which the liquid crystal injection hole formation region is formed by etching the exposed common electrode 270.

Figure 42:
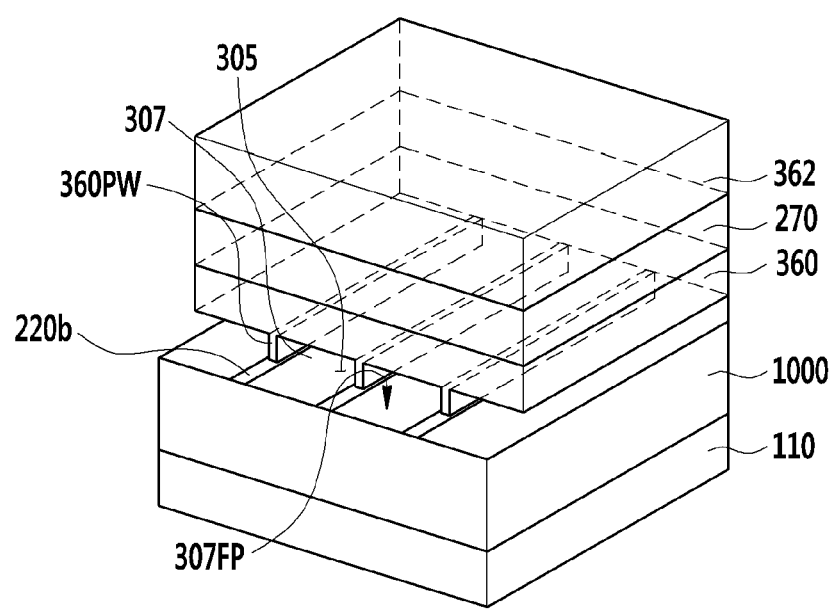

Referring to FIG. 42, the roof layer 360, the partition wall 360PW, and the liquid crystal injection hole formation region 307FP are formed by developing the original roof layer 360M. The microcavities 305 surrounded by the roof layer 360 and the partition wall 360PW are formed, and the liquid crystal injection hole formation region 307FP is formed between the microcavities 305.

Figure 43:
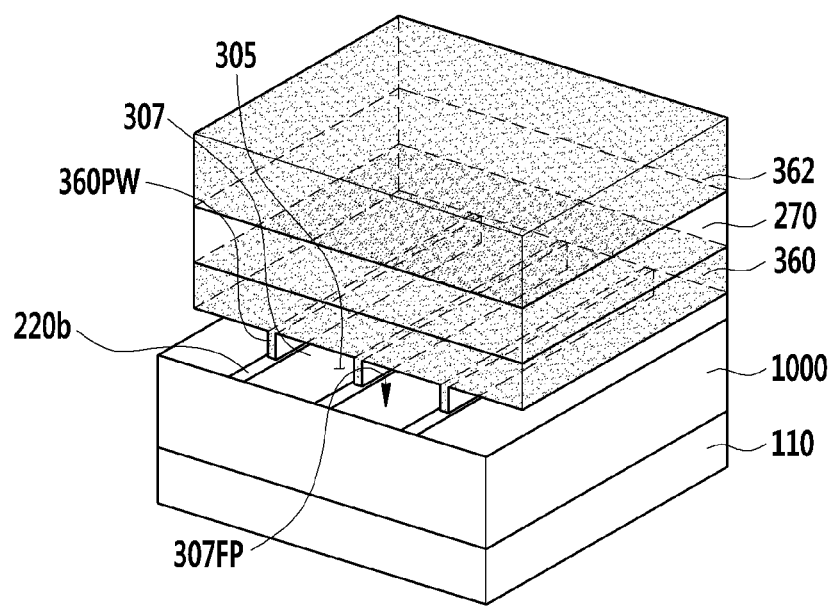

Referring to FIG. 43, durability of the roof layer 360 and the upper roof layer 362 can be improved by hardening the roof layer 360 and the upper roof layer 362. Herein, the hardening temperature is in a range of about 150 to about 250° C. Then, the liquid crystal material is dripped into the liquid crystal injection hole formation region 307FP, and then injected into the microcavities 305 through the liquid crystal injection hole 307 provided at an inlet of the microcavities 305. An aligning material may be injected into the microcavities 305 before the injection of the liquid crystal material.

Figure 44:
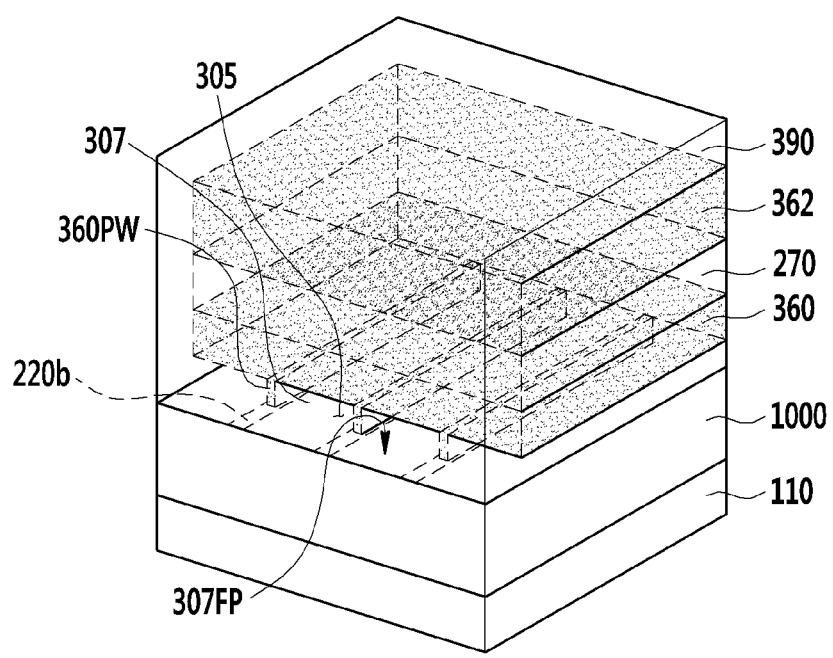

Referring to FIG. 44, a capping layer 390 is formed to fill the liquid crystal injection hole formation region 307FP. Although not shown, a polarizer may be attached to a lower end of the substrate 110 and an upper end of the capping layer 390.

While this invention has been described in connection with certain embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display comprising:
   a substrate;
   a thin film transistor disposed on the substrate;
   a pixel electrode disposed on the thin film transistor; and
   a roof layer facing the pixel electrode,
   wherein a plurality of microcavities are disposed between the pixel electrode and the roof layer, each microcavity of the plurality of microcavities including liquid crystal materials, and wherein a partition wall is disposed between the microcavities, the roof layer including a dry film.

2. The liquid crystal display of claim 1, wherein the roof layer and the partition wall are made of different materials from one another.

3. The liquid crystal display of claim 2, wherein a width of the partition wall becomes narrower when viewed from the substrate toward the roof layer.

4. The liquid crystal display of claim 3, further comprising a capping layer disposed on the roof layer,
   wherein the capping layer contacts an upper surface of the roof layer.

5. The liquid crystal display of claim 4, wherein a liquid crystal injection hole formation region is disposed between the microcavities, and the capping layer covers the liquid crystal injection hole formation region.

6. The liquid crystal display of claim 5, further comprising a common electrode disposed between the microcavities and the roof layer.

7. The liquid crystal display of claim 6, wherein the common electrode is disposed between the partition wall and the roof layer.

8. The liquid crystal display of claim 7, wherein the common electrode is in contact with the roof layer.

9. The liquid crystal display of claim 5, further comprising a common electrode having a protection layer disposed between the common electrode and the pixel electrode.

10. The liquid crystal display of claim 9, wherein the roof layer is in contact with the partition wall.

11. The liquid crystal display of claim 1, wherein the partition wall includes a dry film, and the partition wall and the roof layer together form an integrally formed structure.

12. The liquid crystal display of claim 11, wherein the partition wall becomes wider when viewed from the substrate toward the roof layer.

13. The liquid crystal display of claim 12, further comprising
a common electrode disposed on the roof layer.

14. The liquid crystal display of claim 13, further comprising
a capping layer disposed on the common electrode,
wherein a liquid crystal injection hole formation region is disposed between the microcavities, and the capping layer covers the liquid crystal injection hole formation region.

15. The liquid crystal display of claim 14, further comprising
an upper roof layer disposed between the common electrode and the capping layer.

16. A method of manufacturing a liquid crystal display, the method comprising:
forming an original roof layer on a carrier substrate;
forming a transfer structure by forming a common electrode on the original roof layer;
forming a partition wall on a display panel including a thin film transistor;
forming a plurality of microcavities surrounded by the partition wall and the original roof layer by transferring the transfer structure onto the display panel;
separating the carrier substrate from the transfer structure;
exposing a part of the common electrode by partially removing the original roof layer;
forming a liquid crystal injection hole formation region between the microcavities by partially etching the exposed part of the common electrode;
injecting a liquid crystal material into the microcavities through the liquid crystal injection hole formation region; and
forming a capping layer to fill the liquid crystal injection hole formation region.

17. The method of manufacturing of claim 16, wherein the original roof layer comprises a dry film resist.

18. The method of manufacturing of claim 17, wherein forming the partition wall comprises:
removing the partition wall from the liquid crystal injection hole formation region; and
forming the partition wall to be provided at a region corresponding to a light-blocked region of the display panel.

19. The method of manufacturing of claim 18, further comprising
forming a roof layer by partially removing the original roof layer and hardening the roof layer.

20. The method of manufacturing of claim 19, wherein the common electrode is provided between the partition wall and the roof layer.

21. A method of manufacturing of a liquid crystal display, the method comprising:
forming an original roof layer on a carrier substrate;
forming a transfer structure including a roof layer region and a partition wall region by exposing the original roof layer;
transferring the transfer structure onto a display panel including a thin film transistor;
separating the carrier substrate from the transfer structure;
respectively forming a roof layer and a partition wall at the roof layer region and the partition wall region by developing the original roof layer, forming a plurality of microcavities surrounded by the partition wall and the original roof layer, and forming a liquid crystal injection hole formation region between the microcavities;
forming a common electrode on the roof layer;
injecting a liquid crystal material into the microcavities through the liquid crystal injection hole formation region; and
forming a capping layer to fill the liquid crystal injection hole formation region.

22. The method of manufacturing of claim 21, further comprising forming an upper roof layer including a photo-reactive material on the common electrode,
wherein the common electrode is patterned by using the upper roof layer as a mask.

23. The method of manufacturing of claim 22, further comprising
hardening the roof layer and the partition wall.

24. A method of manufacturing a liquid crystal display, the method comprising:
forming an original roof layer on a carrier substrate;
forming a transfer structure including a roof layer region and a partition wall region by exposing the original roof layer;
transferring the transfer structure onto a display panel including a thin film transistor;
separating the carrier substrate from the transfer structure;
forming a common electrode on the original roof layer;
exposing a part of the original roof layer by patterning the common electrode;
respectively forming a roof layer and a partition wall at the roof layer region and the partition wall region by developing the original roof layer, forming a plurality of microcavities surrounded by the partition wall and the original roof layer, and forming a liquid crystal injection hole formation region between the microcavities;
injecting a liquid crystal material into the microcavities through the liquid crystal injection hole formation region; and
forming a capping layer to fill the liquid crystal injection hole formation region.

25. The method of manufacturing of claim 24, further comprising
forming an upper roof layer including a photo-reactive material on the common electrode,
wherein the common electrode is patterned by using the upper roof layer as a mask.

26. The method of manufacturing claim 25, further comprising
hardening the roof layer, the partition wall, and the upper roof layer.

* * * * *